US005573721A

United States Patent [19]
Gillette

[11] Patent Number: 5,573,721
[45] Date of Patent: Nov. 12, 1996

[54] USE OF A SUPPORT LIQUID TO MANUFACTURE THREE-DIMENSIONAL OBJECTS

[75] Inventor: Paul C. Gillette, Newark, Del.

[73] Assignee: Hercules Incorporated, Wilmington, Del.

[21] Appl. No.: 389,514

[22] Filed: Feb. 16, 1995

[51] Int. Cl.[6] ............ B29C 35/08; B29C 41/02; B29C 41/52

[52] U.S. Cl. ............ 264/401; 73/293; 73/305; 73/319; 73/322.5; 118/100; 118/120; 118/423; 118/428; 118/429; 118/500; 118/620; 118/712; 156/64; 156/272.8; 156/273.5; 156/275.5; 156/307.1; 156/378; 156/379.6; 156/538; 250/432 R; 250/492.1; 250/577; 264/40.1; 264/40.7; 264/255; 264/298; 264/308; 340/619; 340/623; 340/624; 359/350; 365/106; 365/107; 385/119; 425/135; 425/145; 425/174.4; 427/8; 427/356; 427/358; 427/510; 427/512; 427/553; 427/554; 427/555

[58] Field of Search ............ 264/40.1, 40.7, 264/255, 298, 308, 401; 425/135, 145, 174.4; 156/64, 272.8, 273.3, 273.5, 275.5, 307.1, 378, 379.6, 538; 427/8, 356, 358, 510, 512, 553, 554, 555; 118/100, 120, 423, 428, 429, 500, 620, 712; 73/293, 305, 319, 322.5; 250/432 R, 492.1, 577; 340/619, 623, 624; 359/350; 364/468, 476; 365/106, 107; 395/119

[56] References Cited

U.S. PATENT DOCUMENTS

| 4,383,759 | 5/1983 | Bloothoofd et al. | 355/85 |
|---|---|---|---|
| 4,450,226 | 5/1984 | Bloothoofd | 430/300 |
| 4,489,671 | 12/1984 | Choinski | 118/412 |
| 4,575,330 | 3/1986 | Hull | 425/174.4 |
| 4,929,402 | 5/1990 | Hull | 264/401 |
| 4,961,154 | 10/1990 | Pomerantz et al. | 395/119 |

(List continued on next page.)

FOREIGN PATENT DOCUMENTS 1-228827  9/1989  Japan ............ 264/401

OTHER PUBLICATIONS

Howard, W. E., "Thin–Film–transistor/liquid crystal display technology—an introduction", *IBM J. Res. Develop.*, vol. 36, No. 1, Jan. 1992. pp. 3–10.

Kodama, H., "Automatic method for fabricating a three–dimensional plastic model with photo–hardening polymer", *Rev. Sci. Instrum.*, vol. 52, No. 11, Nov. 1981, pp. 1770–1773.

(List continued on next page.)

*Primary Examiner*—Leo B. Tentoni
*Attorney, Agent, or Firm*—Mark Goldberg; Martin F. Sloan

[57] ABSTRACT

A system is provided for producing a three dimensional object from a reactive liquid medium capable of being solidified. The object is constructed from many successive layers of the solidified reactive liquid medium when subjected to appropriate synergistic stimulation. A reservoir contains both the reactive liquid medium and an underlying supporting, substantially immiscible, non-reactive liquid medium. To begin forming the object, a platform within the reservoir is initially positioned at a depth equal to the thickness of a first layer to be solidified, and continues to support the object being constructed. The synergistic source radiates toward the reactive liquid medium and imaging apparatus defining a three dimensional object of required configuration selectively controls the size and shape of that part of a new two dimensional layer to be solidified. At least part of the new layer is solidified, after which a further layer is applied. This sequence is repeated until all of the solidified layers define the three dimensional object being constructed. In another embodiment, a first part of the new two dimensional layer of the reactive liquid medium is solidified, then all unreacted reactive liquid medium is removed from the reservoir and replaced with a new layer of the reactive liquid medium having a substantially uniform thickness and generally coplanar with and equivalent to the thickness of the first part solidified earlier. Then the second part of the new two dimensional layer of the reactive liquid medium corresponding to the replacement liquid medium is solidified.

53 Claims, 15 Drawing Sheets

U.S. PATENT DOCUMENTS

| | | | |
|---|---|---|---|
| 5,011,635 | 4/1991 | Murphy et al. | 264/401 |
| 5,015,424 | 5/1991 | Smalley | 264/401 |
| 5,120,476 | 6/1992 | Scholz | 264/401 |
| 5,174,931 | 12/1992 | Almquist et al. | 264/401 |
| 5,174,943 | 12/1992 | Hull | 264/308 |
| 5,238,614 | 8/1993 | Uchinono et al. | 264/401 |
| 5,247,180 | 9/1993 | Mitcham et al. | 250/492.1 |
| B1 4,575,330 | 12/1989 | Hull | 425/174.4 |

OTHER PUBLICATIONS

Adamson, A. W., Physical Chemistry of Surfaces, A Wiley-Interscience Publication New York: 1976, pp. 99–195.

Gaines, Jr., G. L., *Insoluble Monolayers at Liquid–Gas Interfaces* Interscience Publishers, New York: 1966, pp. 30–135, 301–325.

Pearson, J. R. A., *Mechanics Of Polymer Processing* Elsevier Applied Science Publishers, New York: 1985, pp. 202–242.

Rauwendaal, C., *Polymer Extrusion* Hanser Publishers, New York: 1986, pp. 442–457.

Holian, S. K. and Bergstrom, N., "A New Method For Direct Imaging", *Printed Circuit Fabrication,* vol. 12, No. 1, Jan., 1989, 4 pages.

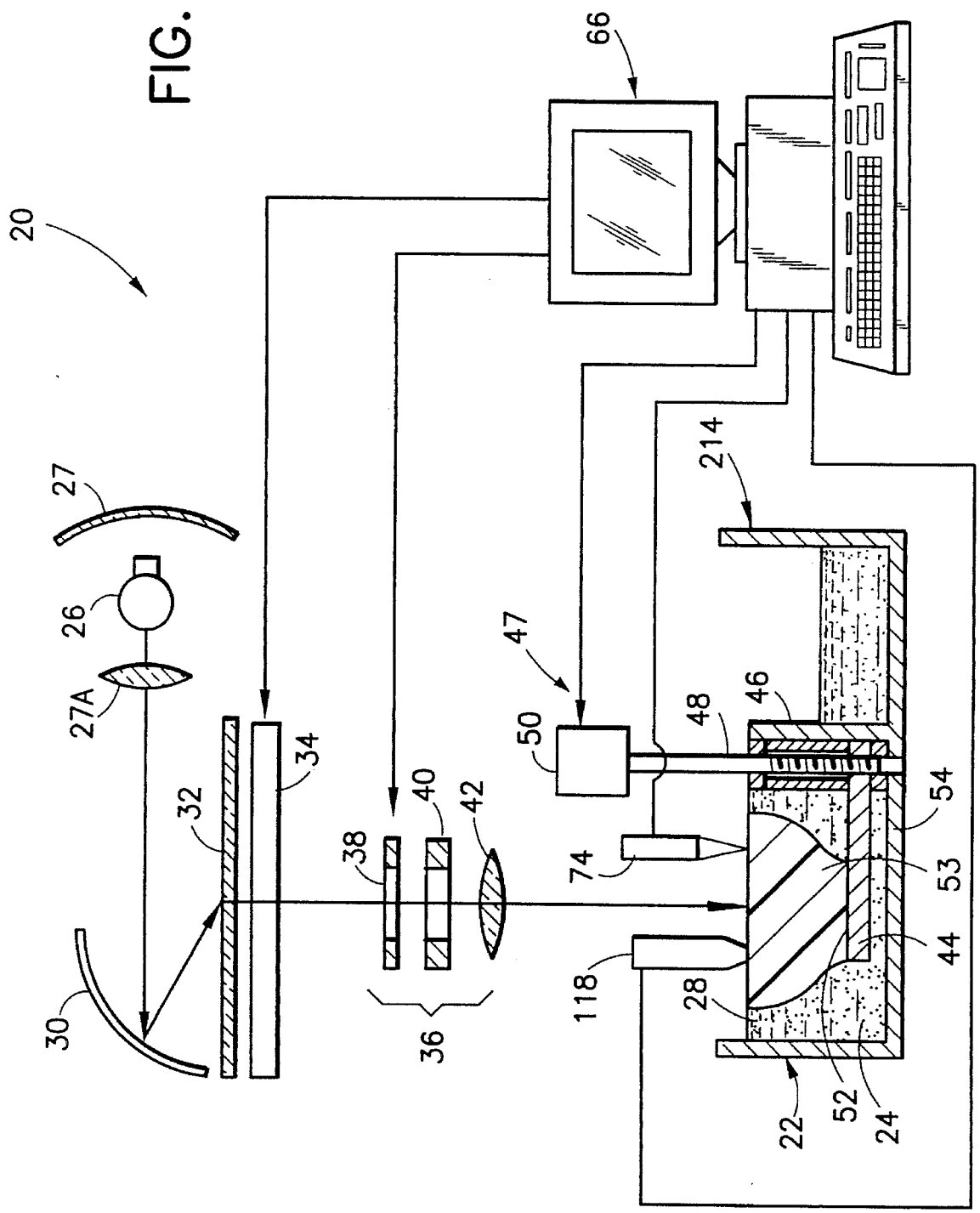

USE OF A SUPPORT LIQUID TO MANUFACTURE THREE-DIMENSIONAL OBJECTS

BACKGROUND OF THE INVENTION

1. Field of the Invention

This invention relates generally to improvements in a method and apparatus for the production of three-dimensional objects. Specifically the invention employs an inert or non-reactive support liquid on top of which is floated a reactive liquid medium. Sequential thin cross-sectional layers of the object are solidified by a source of synergistic stimulation selectively impinging upon the surface of the reactive liquid medium.

2. Description of the Prior Art

A variety of techniques have been proposed for producing three dimensional objects by selectively transforming reactive liquid media into solids. Good descriptions of a number of these processes may be found in Marshall Burns' booked entitled: "Automated Fabrication: Improving Productivity in Manufacturing and Rapid Prototyping & Manufacturing", PTR Prentice Hall, Englewood Cliffs, N.J., 1993. In a number of instances, the methods described therein are based upon solidifying a thin layer of material located at the surface of a reservoir containing a partially fabricated part submerged below the surface by an amount equal to the desired layer thickness. By repeating the following steps an object can be built up from a series of appropriately soldified thin cross-sections:

(1) forming a thin layer of desired thickness using a reactive liquid medium on the surface of a previously solidified layer or suitable supporting structure in the case of the first layer; and (2) selectively solidifying regions of the reactive liquid medium to a defined depth (i.e. thickness) corresponding to elements of the object's cross-section at that particular height position.

With respect to step (2), a variety of techniques have been proposed for solidifying the reactive liquid medium (hereafter referred to as "imaging"): translating an optical fiber in a plane parallel to the reactive liquid medium's surface, mask(s), as well as using a scanning system to position a laser beam on the liquid's surface to "draw" the cross-section of interest. Masking techniques for forming images include, but are not limited to, methods for forming masks out of line such as film, laser "writing" on special LCD substrates an example of which is described by Holian (S. K. Holian et al., "A New Method for Direct Imaging", *Printed Circuit Fabrication*, Vol. 12, No. 1, January 1989) or electrophotographic processes such as those disclosed in U.S. Pat. No. 4,961,154 (Pomerantz et al.), as well as programmable mask technologies examples of which include electro-luminescent displays, plasma displays, liquid crystal displays and micromirror arrays (U.S. Pat. No. 5,247,180—Mitcham et al.).

Rapid prototyping systems requiring the partially fabricated object to be substantially surrounded by reactive liquid medium for substantially the duration of the object fabrication process have a number of undesirable features: Production of even a very small part requires an entire reservoir to be filled with reactive liquid medium. This is especially troublesome when users need to make parts from different materials since one is forced to purchase a full reservoir of every material of interest which can prove to be very expensive. Material shelf life can become a problem if large quantities of reactive liquid medium are not routinely consumed. Production of large parts from a reservoir filled with a reactive liquid medium presents a number of problems: The cost of the reactive liquid medium alone would preclude very large parts such as a full scale car body model from being produced as a single piece. Environmental and worker safety considerations would also make handling of such large quantities of reactive liquid medium difficult. Part distortion resulting from absorption of reactive liquid medium during fabrication can pose problems since the object is surrounded by unreacted liquid medium for an extended period of time. Even if an object could be initially fully cured, the absorbed reactive liquid medium would require a post-cure step.

A number of prior art patents utilize inert liquids in conjunction with reactive liquid media in the context of producing three dimensional objects. U.S. Pat. Nos. 4,575,330 (Hull), 4,929,402 (Hull), 5,015,424 (Smalley), and 5,174,943 (Hull) all disclose a process in which a reactive liquid medium floats on the surface of an inert transparent liquid. Unlike the process of the present invention, however, these patents describe a process involving irradiation through the supporting liquid. The fabricated object is drawn away from the support liquid's surface. In this instance, the support liquid acts as a release agent. Without it, the newly formed layer would contact a solid surface and would be very difficult to remove. In the depicted embodiment, the inert fluid does not provide any support to the solidified layers as they are translated away from the imaging plane. Consequently thin overhanging layers would be difficult to form using this process.

U.S. Pat. No. 5,011,635 (Murphy et al.) also employs a second liquid phase. In this instance, however, a flexible membrane separates a volume containing the fabricated object and reactive liquid medium from the second liquid phase. Separating the phases with a membrane not only proves cumbersome from a practical standpoint but also fails to realize many of the benefits of true support fluid technology as discussed in the present disclosure.

Although some reduction in reactive liquid medium is realized by using the process disclosed in U.S. Pat. No. 5,011,635, the present invention offers an even greater reduction. In addition, unlike the present invention, this prior art process requires that the object be fully immersed in reactive liquid medium during the entire part fabrication cycle which can lead to object distortion. Other advantages of the present invention relative to this process will be apparent to the reader.

U.S. Pat. No. 5,120,476 (Scholz) involves polymerizing a fine stream that is sprayed onto the surface of a support liquid which is very different than selectively polymerizing regions of a thin film of photoresin floated on the surface of another liquid proposed in the present invention. Among other things, U.S. Pat. No. 5,120,476 does not employ a continuous photoresin layer, has a variable focal plane, and requires uninterrupted irradiation of the photopolymer.

U.S. Pat. No. 4,961,154 describes a rapid prototyping apparatus which employs a support material. Unlike the present invention, the support material may be a very high density material.

It was in light of the prior art as just described that the present invention was conceived and now has been reduced to practice.

SUMMARY OF THE INVENTION

The present invention is designed to overcome many of the aforementioned limitations associated with reservoir-based rapid prototyping systems. As with some of the prior art, the present invention constructs an object by selective transformation of an overlying liquid layer to a solid to form a consecutive series of adjoining thin cross-sectional layers. In contrast to the prior art, however, it does so by employing an additional non-reactive (i.e. inert) liquid supporting medium in a novel manner in lieu of a reservoir containing only reactive liquid medium. A variety of advantages will be apparent to the reader arise from the inclusion of this process modification.

According to the present invention, a system is provided for producing a three dimensional object from a reactive liquid medium capable of being solidified. The object is constructed from a plurality of successive layers of the solidified reactive liquid medium when subjected to appropriate synergistic stimulation. A reservoir contains both the reactive liquid medium and an underlying substantially immiscible non-reactive liquid medium for supporting the reactive liquid medium. In one embodiment a platform within the reservoir is initially positioned at a depth which is substantially equal to a uniform thickness of that part of a first layer to be solidified to begin forming the object and continues to support the object being constructed. The synergistic source is directed toward the reactive liquid medium and imaging apparatus utilizing coordinate information defining a three dimensional object of required configuration is operated for selectively controlling the size and shape of that part of a new two dimensional layer of the reactive liquid medium to be solidified. At least part of the new layer of the reactive liquid medium is solidified, after which a further layer is applied having a substantially uniform thickness overlying the new solidified layer on the object and equivalent to the thickness of that part of the next succeeding two dimensional layer to be solidified. This sequence is repeated until all of the solidified layers define the three dimensional object being constructed. In another embodiment, a first part of the new two dimensional layer of the reactive liquid medium is solidified, then all unreacted reactive liquid medium is removed from the reservoir and replaced with a new layer of the reactive liquid medium having a substantially uniform thickness and generally coplanar with and equivalent to the thickness of the first part solidified earlier. Then the second part of the new two dimensional layer of the reactive liquid medium corresponding to the replacement liquid medium is solidified.

A primary object of the invention is to minimize the quantity of reactive liquid medium required to construct an object. Known techniques require reservoirs containing large volumes of reactive resin. The present invention only requires a slight excess of reactive liquid medium. This feature of the invention leads to a large number of benefits.

Another object of the invention is to provide users with greater materials flexibility. Known techniques often require a full reservoir of reactive liquid medium to produce even the smallest part. This can represent a considerable investment if a single small part needs to be produced from a new material. In the present invention, only a small excess of reactive liquid medium is required. Since considerably less material is required to produce objects, users of the teachings of the present invention are not required to purchase a large excess of reactive liquid medium to produce a small object. Materials can be changed by simply removing the layer of unreacted liquid medium from the reservoir by draining or solidification and replacing it with a different reactive liquid medium.

A further object of the invention is to reduce reactive liquid medium inventory and waste. Objects are constructed from fresh reactive liquid medium, not from a reservoir containing a large volume of reactive liquid material which may degrade over time. Users can purchase sufficient material to construct specific objects using specific materials and are not required to purchase large excesses of material to fill a reservoir which may lead to storage problems if the excess material is not consumed within a reasonable time.

Still another object of the invention is to produce larger objects than previously. Known systems require large reservoirs containing reactive liquid medium which becomes impractical from standpoints of both worker safety and cost. The present invention requires a reservoir large enough to contain the object, but the bulk of the volume not occupied by the object is occupied by support liquid, not by reactive liquid medium as with other techniques. Furthermore, the prolonged exposure of a partially fabricated object to unreacted reactive liquid medium as required by the long build times associated with large objects by known techniques can lead to part distortion. In the present invention, this is not an issue since the object is surrounded by an inert support liquid.

Still a further object of the invention is cost reduction. By applying the teachings of the present invention, less material is required in inventory and less waste is experienced.

Yet another object of the present invention is to increase the speed of part fabrication. The invention enables the use of higher molecular weight resins due to ability to reduce viscosity by short term heat exposure. Heating of resins using known reservoir-based object fabrication techniques requires prolonged exposure of the reactive liquid medium to elevated temperatures leading to possible degradation with premature solidification. In addition, the present invention permits a different type of reactive material to be more readily used that enables individual parts to be made from both thick and thin layers thereby reducing object build time.

Yet a further object of the invention is to increase part precision and accuracy. By fabricating the object from reactive liquid medium layers of the target thickness (as opposed to simply attempting to solidify to the desired thickness, the reactive liquid medium can be fully cured in situ instead of only partially reacted. Since the object is surrounded by an inert liquid medium during fabrication there is no absorption of unreacted low molecular weight material from the reservoir as with some other approaches which can lead to part distortion and require post curing. In the present invention, objects can be produced from extremely thin layers of reactive liquid resins, limited only by the ability to float one material on top of another. Other processes generally employ reactive liquid media which are optimized for a particular layer thickness. Since some embodiments of the present invention permit full layer thickness curing, over-exposure (i.e. exposure beyond the point required to solidify a layer to the desired thickness) does not present a problem with the present invention as it would with known techniques where it would lead to a layer with too great a thickness being formed. In fact, with the present invention, over-exposure is actually a benefit since it serves to more fully complete solidification thereby minimizing object distortion. In addition, the present invention permits individual objects to be produced from both thick and thin layers which enables better object building strategies tailored to reduce fabrication time and provide maximum resolution for the specific geometry of the object of interest.

Still another object of the invention is to fabricate objects having greater functionality than previously possible. The present invention permits composite articles to be produced by alternating the composition of the overlying reactive liquid medium. The present invention also permits unprecedented control over material properties of extremely complex shapes on a microscopic scale. Known commercial rapid prototyping methods produce objects made from a single material. Known composite production techniques are generally limited to providing assembly of materials without the control offered by the present invention, have been tailored to produce a specific object or provide limited variations of a simple geometry. For example, coextrusion die technology can be used to make a variety of multilayer sheet structures in which the thickness and composition of individual layers is changed from one structure to the next. Precise control of the spatial composition at a microscopic level within a layer is not possible with such a process. A given die is limited to producing coextruded sheet and cannot be used to manufacture other geometries (e.g. a layered cylinder). The present invention does not suffer from these limitations in that it provides complete control of microstructure for unrestricted object geometries.

Still a further object of the invention is to simplify object post-processing. Known reservoir-based object fabrication techniques necessitate both elaborate post-build excess reactive liquid medium removal from a partially cured delicate "green" object having poor mechanical integrity as well as object post-cure steps. With the present invention, it is possible to fully cure objects during the build cycle thereby eliminating the need to perform post cure operations and simplifying reactive liquid medium removal from an object having improved mechanical properties.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 1 is a diagrammatic illustration of a complete system for producing three-dimensional solid objects from a reactive liquid medium;

DETAILED DESCRIPTION OF THE PREFERRED EMBODIMENTS

Figure 2A:
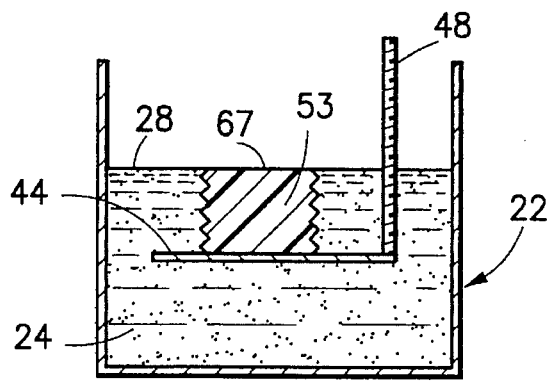
FIGS. 2A–2G are all diagrammatic side elevation views, in section, illustrating various components of the system of FIG. 1 and depicting various aspects, known to the prior art, of applying a new layer of reactive liquid medium to an uppermost surface of the object being formed.

A more detailed discussion of the specific system components of the invention and of their associated functions will be described following an initial review both of pertinent prior art and of co-pending applications covering closely related subject matter. Although not imperative, it may be highly desirable to practice the present invention with one or more facets of the disclosures related in these co-pending applications. This initial review now follows with specific attention, initially, to FIG. 1 which generally illustrates a system 20 for producing a solidified three dimensional object as described in commonly assigned co-pending U.S. application Ser. No. 08/362,690 filed Dec. 22, 1994.

The system 20 includes a reservoir 22 filled with a suitable reactive liquid medium 24 in the form of a reactive liquid medium which is curable, that is, solidifiable, when exposed to a source 26 of synergistic stimulation. A surface 28 of the reactive liquid medium 24 is maintained at a substantially constant level in the reservoir 22. The source 26 of synergistic stimulation is positioned above the reservoir 22 in a manner to project its radiation, with the aid of a parabolic reflecting mirror 27 and a condenser lens 27A, via a suitable mirror 30 toward the surface 28 of the reactive liquid medium 24. Radiation from the source 26 is reflected through a fresnel lens 32 and an adjoining programmable mask 34. The fresnel lens 32 and programmable mask 34 are spaced apart and together spaced from (not in contact with) the surface 28 of the reactive liquid medium 24. The fresnel lens is a well known diffractive optic which serves to image the source onto the entrance pupil of a focussing, or objective, lens 42. An imaging optical system 36 is provided intermediate the programmable mask 34 and the surface 28 and, in part, comprises a shutter 38 capable of operation between an open position enabling transmission of an image from the programmable mask 34 onto the surface 28 of the reactive liquid medium and a closed position preventing such transmission. Adjoining the shutter 38 is an adjustable aperture stop 40 which serves to improve the quality and resolution of the projected image. Additionally, a focusing, or objective, lens 42 is utilized in combination with the aperture stop 40 and shutter 38 to insure that a sharp image is projected onto the surface 28. In the event the programmable mask is in relatively close proximity but not in contact with the surface of the reactive liquid medium, the objective lens 42, the aperture stop 40, and the shutter 38 may be dispensed with.

A platform 44, suitably cantilevered from a weir structure 46, is raised and lowered by means of an object elevator 47. To this end, an inboard end of the platform 44 is operatively engaged with an end of a screw shaft 48 so as to move up and down with an end of the screw shaft as a stepping motor 50 is actuated. Thus, the platform 44 has an upper surface 52 which is selectively movable from a location in the plane of the surface 28 to a location adjacent a base 54 of the reservoir 22. It is on the upper surface 52 that a three-dimensional object 53 is constructed from a plurality of successive layers of the solidified reactive liquid medium.

A suitable computer system 66 is employed for controlling and monitoring operation of the programmable mask 34, the imaging optical system 36, and the stepping motor 50 for raising and lowering the platform 44.

The source of synergistic stimulation 26 comprises an energy source producing radiation capable of inducing chemical reactions which polymerize and/or crosslink or otherwise cause to solidify appropriate reactive liquid media, such as the reactive liquid medium 24. Energy from the source should not substantially effect the performance characteristics of the programmable mask. For example if some types of liquid crystal display devices (LCDs) are employed as masks, prolonged exposure of the mask to high intensity ultraviolet radiation may lead to its unsuitable degradation. Excessive infrared radiation may cause some programmable masks to fail to function properly. Appropriate filtering of radiation sources may be used to obtain radiation in the desired wavelength region of interest. Either polychromatic or monochromatic radiation sources may be used. The low cost of polychromatic radiation sources makes them especially attractive. A preferred radiation source for use with a thin film transistor liquid crystal display (TFT LCD) programmable mask would use visible light although other radiation sources may be suitable. High intensity light from a tungsten halogen bulb is an example of a preferred light source for use with a TFT LCD programmable mask.

The programmable mask 34 represents a device capable of modulating the projected intensity of individual picture elements, or pixels, in real time. A pixel is a spatial resolution element and is the smallest distinguishable and resolvable area in an image, for example, by a liquid crystal display. As such, this device can be used to project a two dimensional representation of a cross sectional area of portion thereof of an object of interest and is capable of rapidly transforming itself (i.e. changing images) when provided appropriate control signals. Liquid crystal displays, liquid crystal light valves, and area array deformable mirror devices (for example, micro-mirror arrays available from Texas Instruments) are examples of suitable programmable mask technologies. Active matrix TFT/LCDs such as those described by Howard (W. E. Howard, "Thin-film-transistor/liquid crystal display technology—an introduction", *IBM J. Res. Develop.*, Vol. 36, No. 1, January 1992), represent a preferred programmable mask technology. High contrast (preferably >100:1) and fast switching speeds (preferably <1 sec) are characteristics of suitable preferred programmable masks. A state of the art LCD system employed for a system for producing three dimensional objects is disclosed in commonly assigned co-pending application Ser. No. 08/266,910 filed Jun. 27, 1994. The disclosure of the aforementioned application is hereby incorporated into the instant disclosure in its entirety, by reference.

Control signals serving to modulate the image may be generated via a variety of means including, but not limited to, (1) direct computer control using known video signal standards (.e.g. VGA), (2) images stored on magnetic videotape or (3) optical recording disks. To construct large objects and/or improve resolution, it may be desirable to utilize more than one programmable mask in the design of the apparatus. Alternatively, the output from a single programmable mask may be reprogrammed and translated to a different region of the surface to form different regions within a given cross sectional area at different points in time.

Image translation may be performed in a variety of ways including, but not limited to, physical translation of the programmable mask/optics across the surface or translation of the projected image by optical means known to those skilled in the art. Translation can occur in discrete steps or, in the case of very fast programmable masks, in a continuous fashion with synchronized suitable modification of the projected image in real time.

Translation of the projected image in increments of less than the distance corresponding to a single projected pixel dimension can be used to improve the apparent resolution of many object features. Depending upon the characteristics of the feature being resolved, multiple steps with different mask exposures may be required. This approach is especially useful when used in conjunction with other imaging techniques.

The preceding disclosure is concerned with the apparatus for selectively solidifying thin layers of reactive liquid media on the surface of the reactive liquid medium corresponding to cross sectional slices of the desired object. The following discussion pertains to the apparatus and operations required to form a thin continuous layer of reactive liquid medium on the most recently created surface of the solidified object 53 to permit formation of a further, or subsequent, layer. This can be performed in a variety of ways.

Figure 2B:
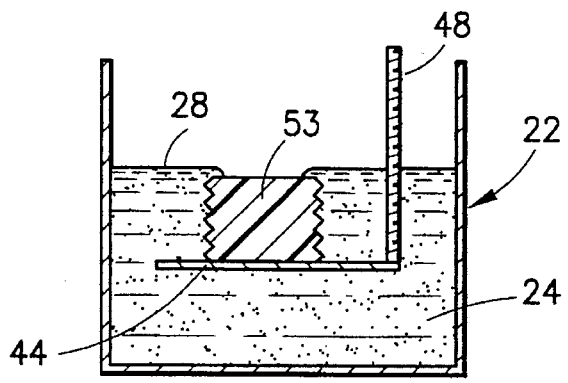
Figure 2C:
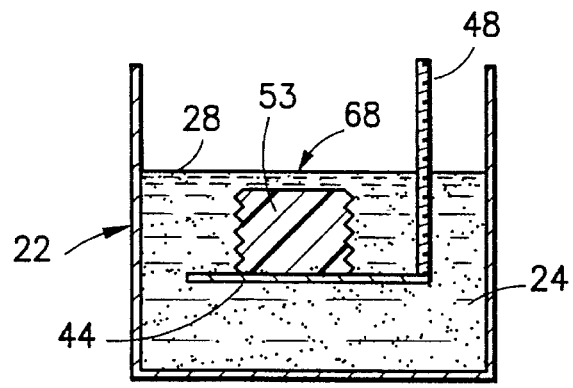

With reference to FIGS. 2A and 2C, the approach for forming a new layer of reactive liquid medium originally described by Kodama (H. Kodama, "Automatic method for fabricating a three-dimensional plastic model with photohardening polymer", *Rev. Sci. Instrum.*, Vol. 52, No. 11, November 1981, pp. 1770–1773) is presented. As seen in FIG. 2A, the upper surface 67 of the partially fabricated object 53 is level with the upper surface 28 of the reactive liquid medium 24. This approach involves lowering the already solidified part of the object 53 from the position illustrated in FIG. 2A a distance such that when the reactive medium flows across surface 67, a layer having a thickness of a single two-dimensional layer 68 is formed. This may be achieved in the manner previously described with reference to FIG. 1. When the object 53 assumes the position illustrated in FIG. 2B, fresh, unreacted reactive liquid medium flows across an upper surface 67 of the previously reacted, now solid, object 53 to form a uniform two dimensional layer 68 (FIG. 2C) of reactive liquid medium capable of undergoing reactive solidification. This technique is best suited for very low viscosity reactive liquid media or structures with thin wall thicknesses. Unfortunately low viscosity often implies low molecular weight reactive liquid media which require a longer exposure tan their higher molecular weight analogues.

Not illustrated in FIGS. 2A through 2C are preferred means for maintaining the focal plane at a fixed position. In the event the reactive liquid medium undergoes a volume change upon solidification, it is preferable to adjust the volume of reactive liquid medium or otherwise alter the shape of the reservoir so as to maintain the surface 28 at a constant distance relative to the imaging optics. A simple variation on this approach is to raise the reactive liquid medium level with appropriate translation of the object building reservoir 22 or imaging optical system 36. In either case, the time required to form a substantially uniform layer of the reactive liquid medium 24 on the upper surface 67 of the previous solidified layer increases with increasing reactive liquid medium viscosity, increasing maximum flow distance across the surface, and decreasing layer thickness. For any point on the interior or a given cross section, the flow distance is the minimum distance between that point and an edge boundary capable of supplying fresh reactive liquid medium. In most cases the maximum flow distance represents the "worst case" point which will require the longest time to replenish fresh reactive liquid medium or, indeed, drain excess reactive liquid medium. This is often a valuable measurement since it can be used to estimate equilibration times. An example of an edge boundary not capable of supplying fresh medium is an interior trapped volume. After some equilibration time, a uniform layer of fresh reactive liquid medium (FIG. 2C) is formed and is ready to be imaged.

Figure 2D:
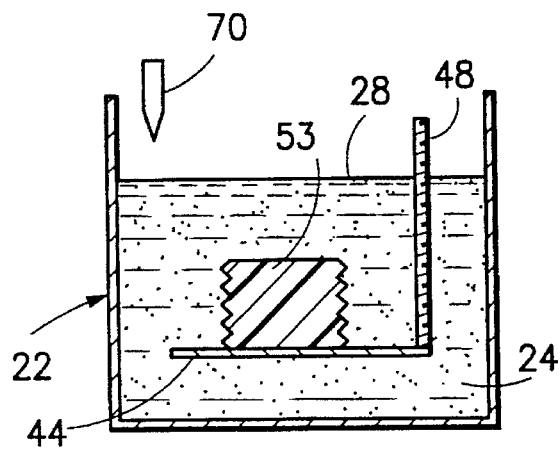
Figure 2E:
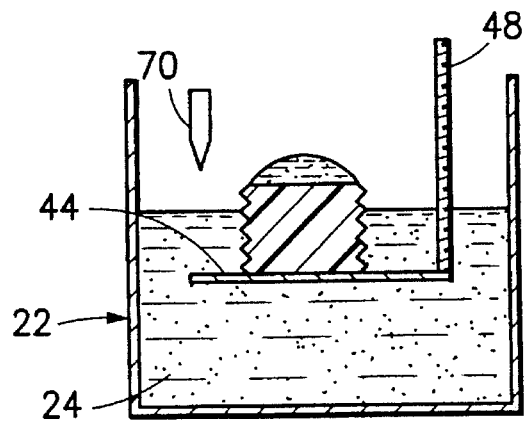
Figure 2F:
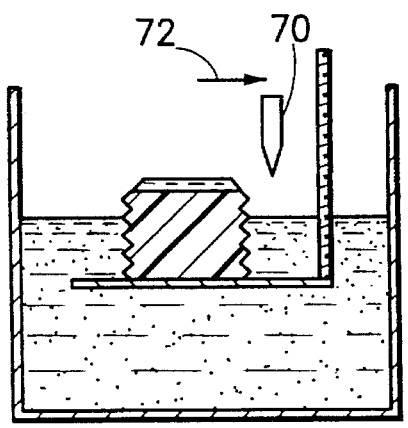

An alternative process which, in some instances, accelerates the fresh reactive liquid medium layer formation process discussed in the context of FIGS. 2A through 2C involves the use of a doctor blade 70, also in and of itself, a known concept. In this instance, the object may be lowered well below the surface 28 (FIG. 2D) so as to accelerate the flow of fresh reactive liquid medium onto upper surface 67. Once the fresh reactive liquid medium flows across upper surface 67 to form a depth of at least the desired layer thickness the partially formed object 53 is raised to a distance equal to the desired layer thickness below doctor blade 70 (FIG. 2E). The next step involves translating the doctor blade 70 in the direction of the arrow 72 to remove excess reactive liquid medium, that is, the reactive liquid medium which is in excess of the desired layer thickness (FIG. 2F).

Figure 2G:
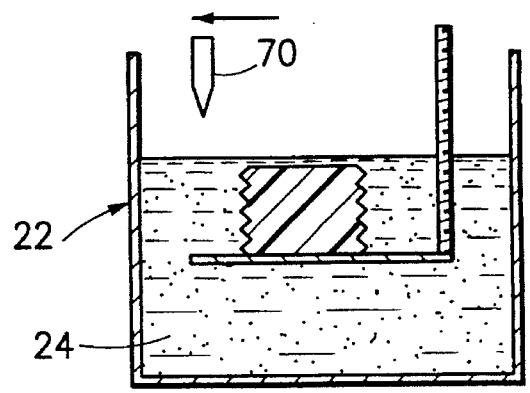

It is understood that excess reactive liquid medium removal may take place in multiple sweeps of the doctor 70. A useful technique when large amounts of reactive liquid medium need to be removed involves incrementally indexing the object closer and closer to the doctor blade with removal of a small amount of reactive liquid medium by the doctor blade on each cycle. This prevents accumulation of large amounts of reactive liquid medium on the leading edge of the doctor blade which might generate subsurface distortions of thin solidified layers. When multiple sweeps are employed, then the final sweep of the doctor blade occurs when the object is positioned below the doctor blade at a distance equal to the desired layer thickness. Earlier sweeps occur at larger distances in this case. Whether excess reactive liquid medium removal is performed in a single pass or multiple passes, the next step (FIG. 2G) requires positioning the object below the surface of the reservoir by lowering the platform 44 to an operating depth such that the upper surface 67 of the object 53 being formed is below the surface 28 to a distance which is substantially equal to the thickness of that part of the next succeeding two dimensional layer to be solidified.

The final levelling step typically involves waiting for the surface to equilibrate prior to exposure to the next mask. Variations on this approach are disclosed in U.S. Pat. Nos. 5,174,931 (Almquist et al.) and 5,238,614 (Uchinono et al.).

Figure 3:
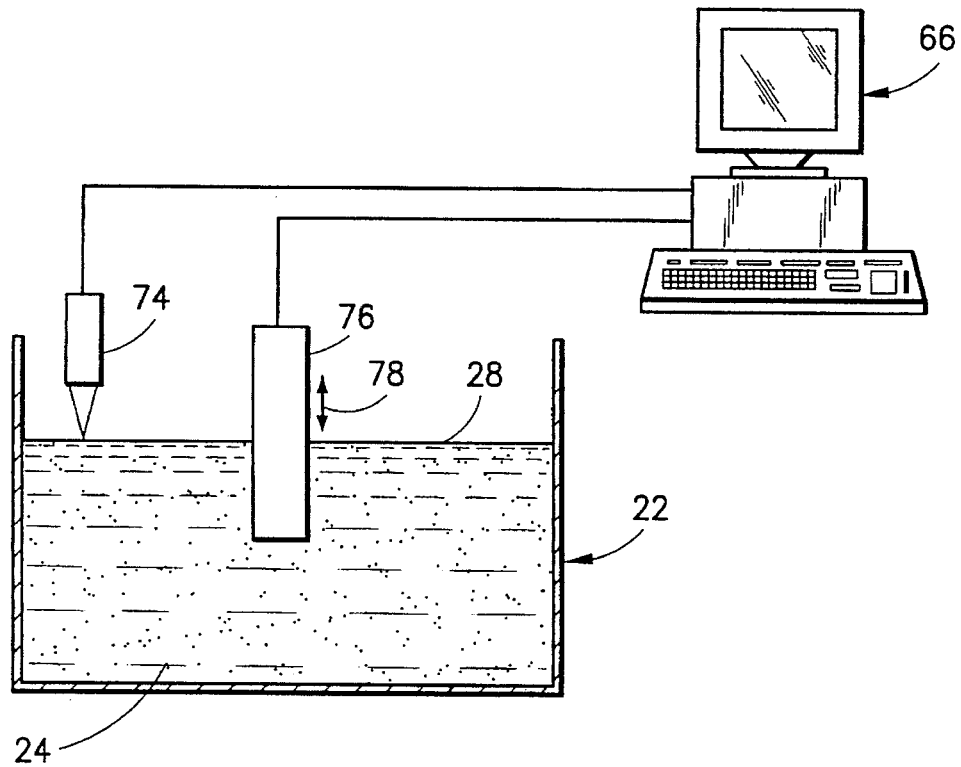
FIGS. 3, 4 and 5 are side elevation views, in section, diagrammatically illustrating various components of the system of FIG. 1 utilizing, respectively, different constructions for maintaining the height of the surface of the reactive liquid medium in a fixed relationship relative to the imaging optical system, another component of the system of FIG. 1.

To avoid unnecessary optical changes during the course of object building, it is preferable that the focal plane, that is, the surface 28 of the reactive liquid medium 24, remain fixed relative to the imaging optical system 36. The height of the reactive liquid medium 24 may change due to thermal fluctuations, reactive liquid medium shrinkage during solidification, changes in displacement of system components in the bath during the course of object building, or other factors. Maintaining a constant focal plane can be accomplished in a variety of ways. For example, as illustrated in FIG. 3, a feedback loop defining the relationship between a suitable level sensor 74 and a variable displacement block 76 offers a great deal of control and flexibility to compensate for process-induced variations in height of the reactive liquid medium 24. The displacement block 76 is partly submerged in the reactive liquid medium 24 and is suitably supported and movable, as indicated by a double arrow 78, into or out of the reactive liquid medium to the extent necessary to accommodate the volume changes which can occur in the reactive liquid medium. As in the instance of the system 20 depicted in FIG. 1, the computer system 66 is utilized to coordinate the functions of the sensor 74 and of the displacement block 76.

Figure 4:
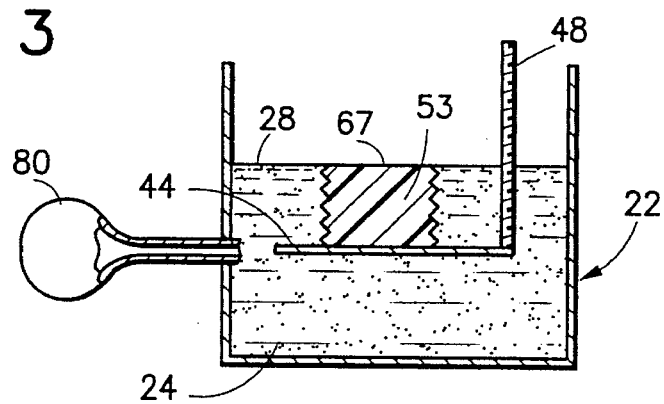

Level sensor 74 is preferably of a noncontact type which may be based, for example, on reflectance measurements of a laser beam. Alternatively, fiber optic bundles may be employed to accurately monitor surface height. Reactive liquid medium surface height may also be adjusted by varying the shape of the volume containing the reactive liquid medium. Operating an elastic syringe 80 containing reactive liquid medium connected to the reservoir, as diagrammatically illustrated in FIG. 4, represents a simple example of this approach. Various other expedients may also be employed. It is also possible to calculate the expected movement of the reactive liquid medium surface during the course of object building based on the reactive medium's solidification characteristics and the process specific characteristics. In this instance, control is simplified since the distance sensor 74 would not be necessary.

Figure 5:
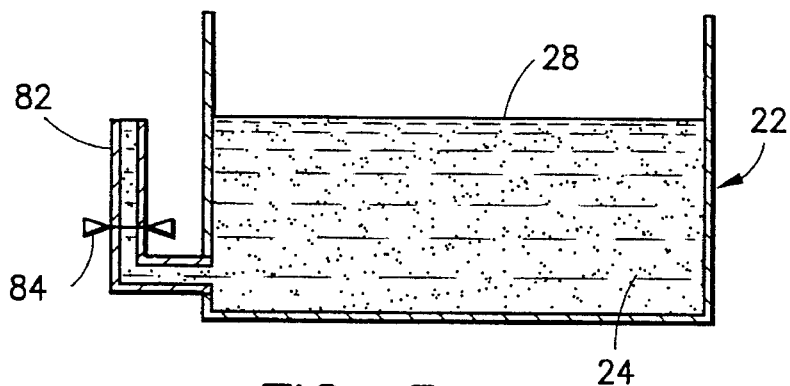
Figure 6A:
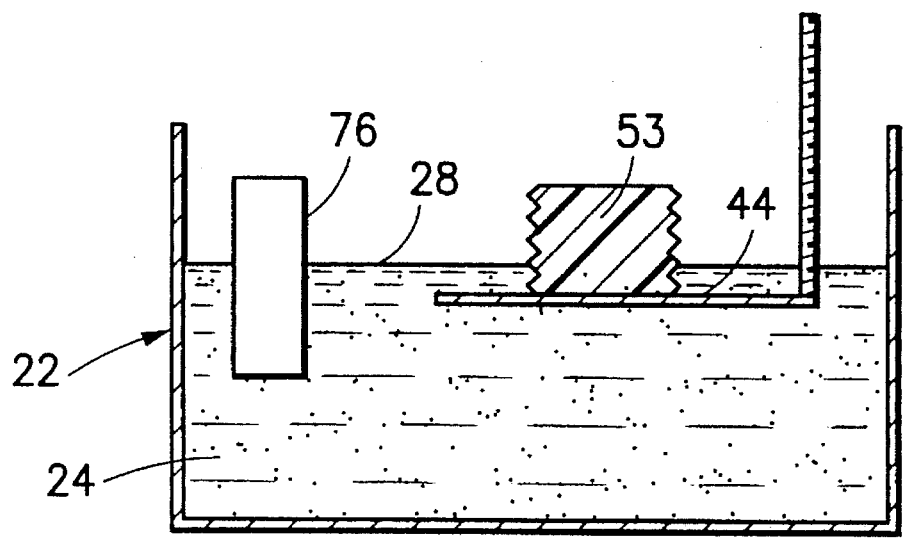
FIGS. 6A and 6B are side elevation views, in section, illustrating various components of the system of FIG. 1 and illustrating, successively, still another construction for maintaining the height of the surface of the reactive liquid medium in a fixed relationship relative to the imaging optical system.
Figure 6B:
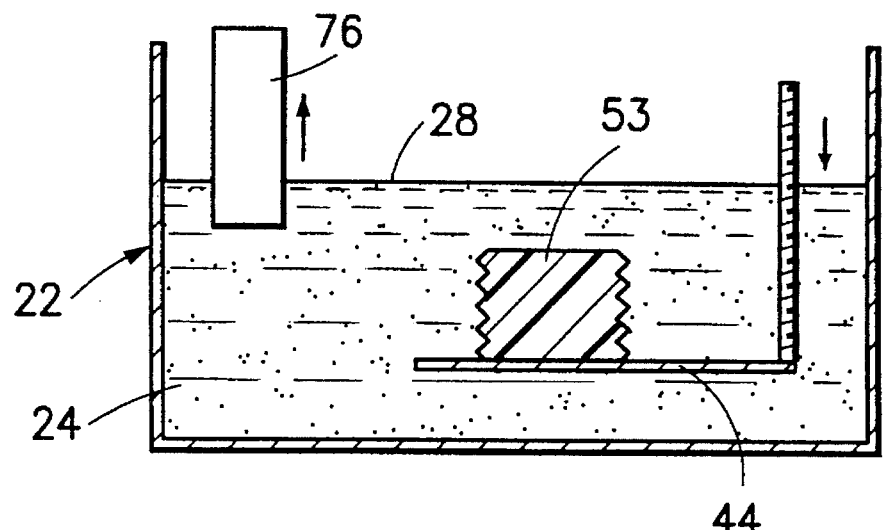

A far simpler and somewhat less flexible construction of maintaining a constant focal plane may involve the use of an overflow spout 86 (FIG. 5). In this case, the height of the overflow spout 82 determines the position of the surface of the reactive liquid medium in the reservoir. Inclusion of a computer activated valve 84 to control flow may be beneficial in some cases to prevent excessive overflow at various points in the levelling sequence. For example, certain object elevator geometries will displace the reactive liquid medium which can be undesirable in some cases. If the additional displacement volume is constant, then such a valve may not be necessary. Considering the former instance, it might be that when the platform 44, is at a substantially raised position as illustrated in FIG. 6A, the displacement block 76 is at a substantially elevated position. Conversely, when the platform 44, is at a substantially lowered position as illustrated in FIG. 6B, the displacement block 76 is at a substantially elevated position. The reactive liquid medium can, of course, be easily recovered and returned to the primary object building reservoir at the appropriate time. In both instances, the positioning of the displacement block accommodates the displacement of the object elevator 47 to assure that the level of the surface 28 in relation to the imaging optical system 36 remains constant.

Figure 7:
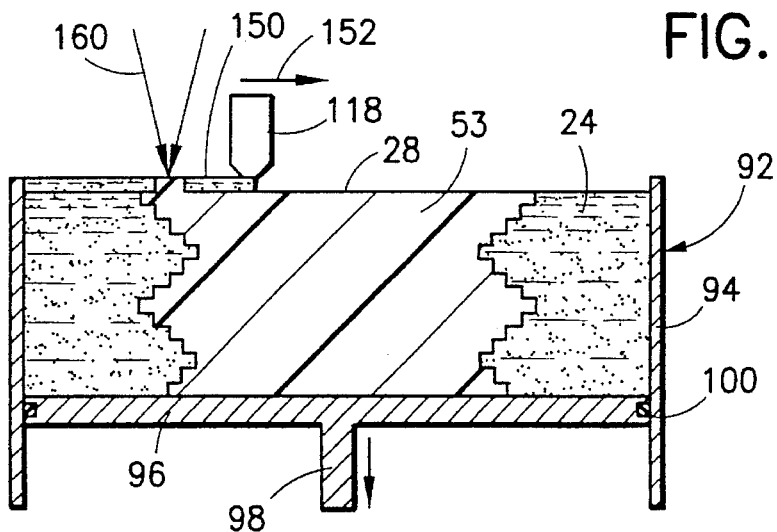
FIG. 7 is a side elevation view, in section, depicting another construction and manner of operation of a system for forming a new layer of reactive liquid medium on the uppermost surface of the object being formed.

Another alternative to maintaining a constant focal plane is to translate the entire reservoir 22 or imaging optical system 36. Such designs are generally more cumbersome, however, since they require controlled movement of larger assemblies than the approaches already discussed. In principle, the object elevator 47 can be replaced with an external reservoir translation assembly to maintain the constant focal length. As the reservoir 22 is filled, the entire assembly could be translated by a corresponding amount to maintain the constant focal distance. A variation on a construction of translating the entire reservoir is illustrated in FIG. 7 in which a modified reservoir 92 includes sidewalls 94 and a platform 96 for supporting the object 53. The platform 96, in this instance, doubles as a base of the reservoir and can be raised and lowered relative to the sidewalls 94 by means of an appropriately actuated plunger 98. A peripheral seal 100 is interposed between a peripheral edge of the platform and the sidewall to retain the reactive liquid medium 24 within the reservoir.

Figure 8:
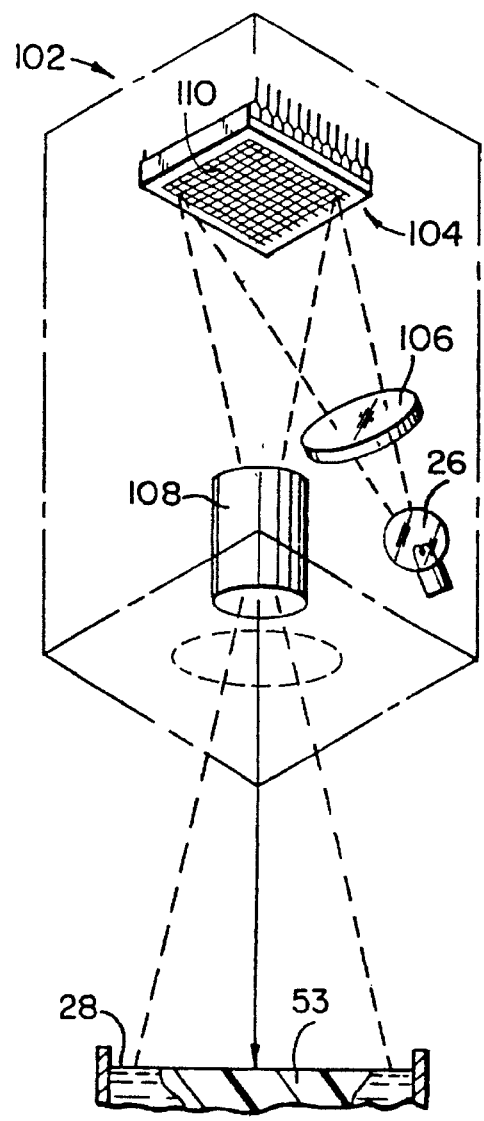
FIG. 8 is a perspective diagrammatic illustration of a modified prior art exposure head for use with the system of FIG. 1.

Another embodiment of the programmable mask 34 is illustrated in FIG. 8 and will now be described. FIG. 8 is a perspective diagrammatic illustration of an exposure head 102 which may replace the mirror 30, fresnel lens 32, and programmable mask 34 provided in FIG. 1. The exposure head 102 comprises a source of synergistic stimulation 26, as previously, an area array deformable mirror device 104, a pair of lenses 106, 108, and necessary control circuitry would be provided by the computer system 66 of FIG. 1. The source 26 emits radiation, as previously, that is operable to solidify the reactive liquid medium 24. The lens 106 more uniformly illuminates the mirror device 104 than would otherwise occur without it. Lens 108 focuses and magnifies the light reflected off the mirror device 104 onto, or toward, the surface 28 of the reactive liquid medium 24. The mirror device 104 may be an electro-optical device containing a regular n×m array of micro-mirrors 110 of the type manufactured by Texas Instruments, Inc. of Dallas, Tex. and as described in U.S. Pat. No. 5,247,180 (Mitcham et al.).

Each micro-mirror element in the array may be electronically controlled to reflect incident radiation along one of a plurality of optical pathways. In its preferred embodiment, the mirror device 104 comprises a matrix such that there are two optical pathways for each micro-mirror. The source 26, mirror device 104, and lenses 106 and 108 are positioned such that radiation impinging upon the mirror device 104 from the source 26 may be focused onto the surface 28 if, and only if, one of the two optical pathways is selected. The optical pathway of radiation emitted from the source 26 is depicted by the converging and diverging dashed lines. Each bistable micro-mirror on the mirror device 104 is controlled by circuitry within the computer system 66 which interprets data from a processor also contained therein.

As noted above, the active surface of the mirror device 104 may contain an n×m matrix of individually addressable bistable micro-mirrors 110. Each micro-mirror is typically a square or diamond having sides of 12 to 20 microns. This small size allows a single mirror device 104 having a footprint of approximately two square inches to have over two million addressable micro-mirrors in, for instance, a 1920×1080 matrix. This small mirror size allows exposure head 102 to solidify a 4×8 square inch area in a single exposure interval with the same resolution as achieved by prior x×y scanner/laser exposure head combinations. Typically, these prior exposure heads achieve resolutions of ±0.005 inches.

Figure 9:
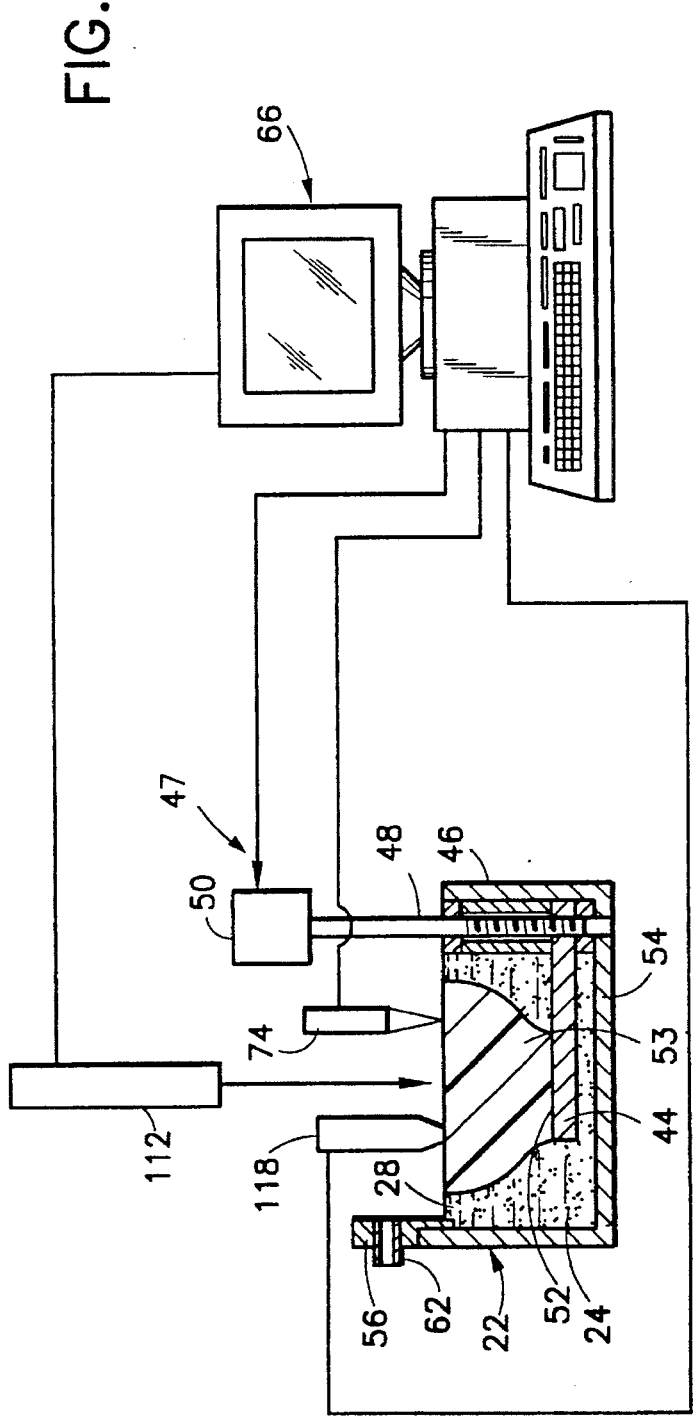
FIG. 9 is a diagrammatic illustration of a system for producing three-dimensional objects from a reactive liquid medium, similar to FIG. 1, but utilizing a laser as the source of synergistic stimulation and for imaging.

In another embodiment of the invention, as seen in FIG. 9, the imaging mechanism may include a movable point source of light 112 selectively movable across the surface of the reactive liquid medium 24 and directed at that part of the two dimensional layer of the reactive liquid medium to be solidified. A typical point source of light might be a laser.

Figure 10:
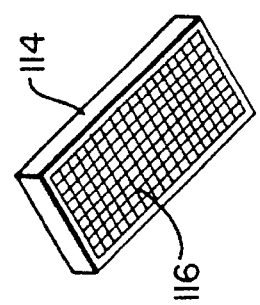
FIG. 10 is a diagrammatic representation, in perspective, of a modified imaging mechanism for use with the system of FIG. 1.

Still another embodiment is illustrated in FIG. 10 in which the imaging mechanism includes a panel 114 comprising a plurality of light emitting diodes 116 providing a plurality of individual pixels capable of defining the size and shape of that part of the two dimensional layer of the reactive liquid medium to be solidified.

In an alternative approach especially well suited for rapidly generating thin layers of high viscosity reactive liquid media, a device is used to deposit a substantially uniform coating of reactive liquid medium 24 directly onto the surface of a previously solidified layer for subsequent selective solidification. In a most preferred embodiment, as seen in FIG. 1, a translating extrusion die 118 serves to deliver the coating. Selectively controlling solidification can be performed with a variety of mechanisms as already discussed. A detailed description of a unique extrusion die system is disclosed in commonly assigned U.S. application Ser. Nos. 08/360,154 filed on Dec. 20, 1994, 08/362,690 filed on Dec. 22, 1994, and 08/362,700 filed on Dec. 22, 1994. The disclosures of the aforementioned applications are hereby incorporated into the instant disclosure in their entirety, by reference.

The use of the extrusion die 118 offers the potential of delivering reactive liquid media whose flow characteristics would not permit coating within reasonable times if other methods were used. Since the object 53 is not translated over long distances relative to the layer thickness, thin features are not disturbed due to movement during the deep dunking operation associated with other processes. In many instances, very high viscosity reactive liquid media can be delivered by simply heating prior to coating to reduce viscosity. This result can be achieved by means of an extrusion die 138 (FIG. 11) whose nozzle 140 has an elongated slot 142 extending across the surface of the reactive liquid medium at a uniform distance. The nozzle 140 is diagrammatically represented as having an electric heating coil 144 embedded therein. In many instances, it is preferable to expose the reactive liquid medium to an elevated temperature for a minimum amount of time to avoid undesired decomposition or reaction. By heating the material inside the die itself and/or shortly before introduction into the die, exposure to elevated temperatures can be minimized. High viscosity media are desired from a processing standpoint since one can use higher molecular weight prepolymers requiring less crosslinking or reaction, that is, faster object fabrication times, than their lower molecular weight analogues. In addition, higher molecular weight media are likely to undergo less shrinkage upon solidification.

A pump 146 is utilized to cause flow of the reactive liquid medium through the elongated slot 142 as the die 138 is translated across the surface of the reactive liquid medium. For purposes only of illustration, and not intended to be limiting, the pump 146 is depicted as drawing from a pair of sources 148, 150 containing reactive liquid media distinct in composition although only one source is necessary for operation. With this arrangement, valves 152, 154 associated with the sources 148, 150, respectively, are operable to deliver the desired quantity of each composition of the reactive liquid media to the die nozzle 140. When both valves are open, the reactive liquid media would be mixed into a substantially homogeneous substance in a suitable mixing device 156.

The specific geometry of the die will depend upon the rheological characteristics of the reactive liquid medium of which the reactive liquid medium is composed as well as other design considerations. U.S. Pat. No. 4,383,759 (Bloothoofd et al.), U.S. Pat. No. 4,450,226 (Bloothoofd), Pearson's text entitled: *Mechanics of Polymer Processing* (Elsevier Applied Science Publishers, New York: 1985) as well as Rauwendaal's text entitled: *Polymer Extrusion* (Hanser Publishers, Munich, Vienna, New York: 1986) provide descriptions for a number of examples of specific suitable die geometries. Other mechanisms for depositing uniform coatings onto the surface of the object 53 and onto the surface 28 of the reactive liquid medium 24 are known to those familiar with coating operations. For example, a rotating cylinder equipped with a dammed reservoir to control the deposition of reactive liquid medium provides an alternative to an extrusion die. An example of this construction is presented in U.S. Pat. No. 4,489,671 (Choinski).

As stated above, the foregoing text which describes pertinent prior art and the disclosure of closely related co-pending applications has served to set the stage for the description of the present invention which represents an improvement over those earlier disclosures.

Figure 12:
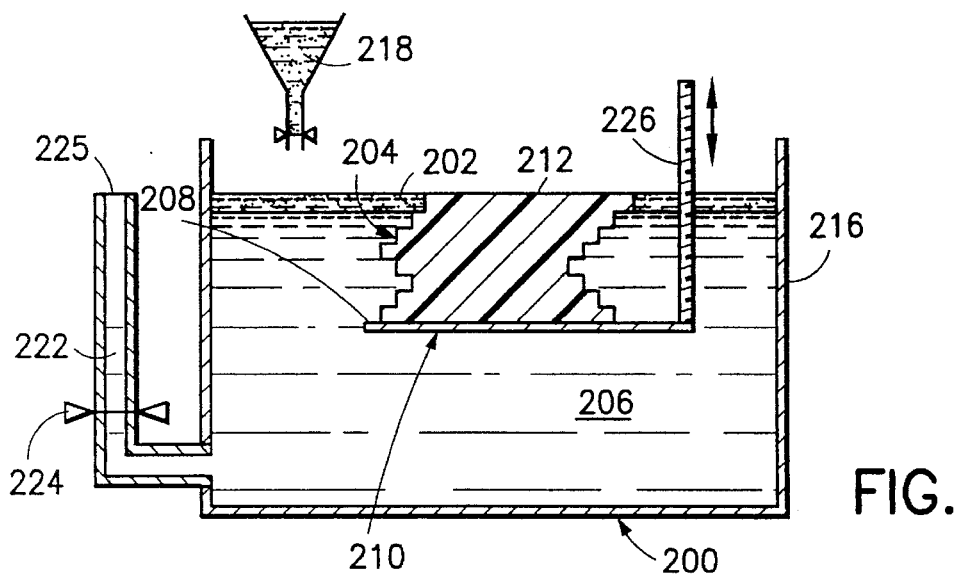
FIGS. 12–14 are side elevation views, partly in section, diagrammatically illustrating various components of a system embodying the invention, and depicting, respectively, successive positions of the components during one cycle of forming a layered object by "full layer thickness curing" wherein reactive liquid medium is applied as a thin layer overlying non-reactive liquid medium.

A first embodiment of the present invention is a technique which will be referred to as "full layer thickness curing". FIG. 12 provides a schematic illustration of an object building reservoir 200 associated with this concept. This approach involves the use of a thin layer 202 of reactive liquid medium having a substantially uniform thickness overlying both an object 204 and a non-reactive support liquid medium 206. In FIG. 12, the most recent layer of the reactive liquid medium has been selectively solidified. Although many of the components necessary for performing the invention are not illustrated in FIG. 12 for purposes of simplicity and, indeed, in many of the subsequent illustrations, their presence will be understood. Such components include, for example, an appropriate source of synergistic stimulation and an appropriate imaging device utilizing coordinate information defining a three dimensional object of required configuration for selectively controlling the size and shape of that part of a new two dimensional layer of the reactive liquid medium to be solidified. Of course, these components have been adequately discussed above in the introductory text.

As described previously, the object 204 is supported on an upper surface 208 of a platform 210 within the reservoir 200. When object-forming is begun, the platform 210 is positioned such that the upper surface 208 is at a depth substantially equal to a uniform thickness of that part of a first layer (for example, the layer 202) to be solidified. Thereafter, the object being constructed continues to be supported on the platform 210 until its construction is completed.

Figure 13:
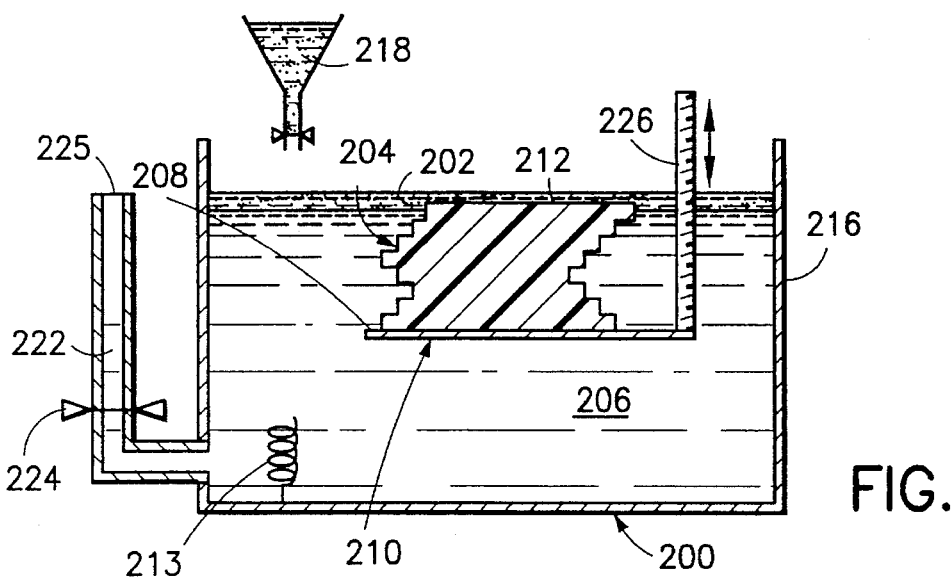

In order to proceed to the next layer, it is necessary to form a thin layer 202 of the reactive liquid medium overlying the upper surface 212 of the partially formed object 204 and of the non-reactive liquid medium 206. If the object is translated downwardly as indicated in FIG. 13, the thickness of the layer 202 of the reactive liquid medium will decrease as it begins to cover the upper surface 212 of the object 204. This, or course, occurs because some of the reactive liquid medium will have been solidified while the remainder of the liquid medium continues to overlie the entire surface of the reservoir. Heating of the non-reactive liquid medium can be used to heat the reactive liquid medium as well, thereby reducing its viscosity and accelerating its flow rate across the upper surface 212 of the object. This may be indicated by a suitably energized heater coil 213 (FIG. 13) within the reservoir 200.

At this point, it is important to recognize that the bulk of the object is surrounded by the non-reactive support liquid 206. A variety of approaches may be used to insure that the reactive liquid medium has the desired thickness. For example, when all layers of the object 204 have the same thickness, one can add a quantity of additional reactive liquid medium to replenish the volume solidified in the most recently formed layer.

Figure 14:
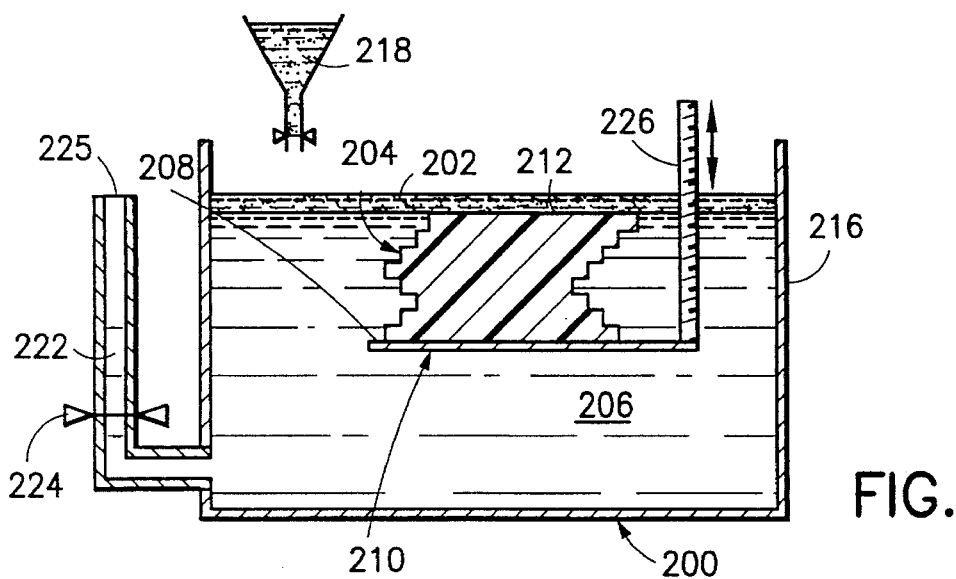

In general, the required volume can be calculated from the cross-sectional area and thickness of the most recently solidified layer, although certain geometric features may result in unreacted reactive liquid medium becoming entrapped within the interior of the object. To avoid possible disruptions in reactive layer medium surface continuity, it is preferred that the liquid addition be done prior to or during object translation. FIG. 14 depicts the position of the object 204 after addition of more reactive liquid medium and translation by one layer thickness.

Figure 15:
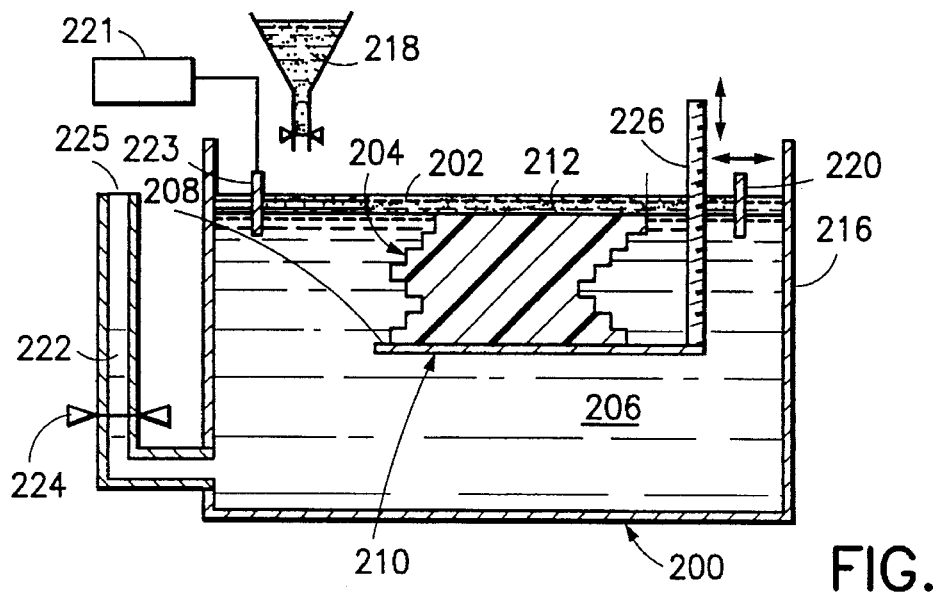
FIG. 15 is a side elevation view, partly in section, illustrating another embodiment of the invention illustrated in FIG. 14, for controlling the depth of a layer of the reactive liquid medium over the uppermost surface of the object being formed.
Figure 15A:
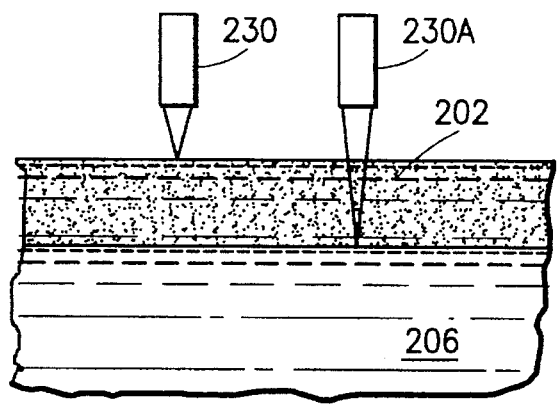
FIG. 15A is a detail diagrammatic side elevation view of a modified construction of the FIG. 15 embodiment for measuring the thickness of a layer of the reactive liquid medium.

Yet another manner of controlling the thickness of the reactive liquid medium may employ a movable barrier 220 as diagrammatically depicted in FIG. 15 for at least partially restraining the reactive liquid medium such that the reactive liquid medium is confined within an enclosed area which is less than that of the reservoir. With the layer 202 thus confined, the size of the enclosed area is then altered so as to maintain a thickness of the reactive liquid medium which is equivalent to the thickness of that part of the next succeeding two dimensional layer to be solidified. In this instance, translation of the barrier 220 to the left or to the right adjusts the thickness of the reactive liquid medium, either increasing it or decreasing it, as necessary. The barrier 220 may be movable under the control of a microprocessor 232 (FIG. 16) operating on information received from sensors 230, 230A (FIG. 15A) which detect, respectively, the upper surface of the layer 202 of the reactive liquid medium and the upper surface of the non-reactive liquid medium 206. An arithmetic computation can thereby determine the thickness of the reactive liquid medium and the microprocessor 232 instructs movement of the barrier 220 accordingly. In FIG. 15, for example, movement of the barrier 220 to the left serves to increase the thickness of the layer 202 while movement to the right serves to decrease the thickness of the layer. When a movable barrier is employed, unless the reservoir to object cross-section area ratio is very large, it will generally be necessary to add additional reactive liquid medium to the surface layer after some period of time. This can be done by any of a variety of means including those already discussed. Successive layers applied in the construction of the object may readily be so applied with different thicknesses to permit users to tailor object build parameters to thereby achieve specific geometric features.

For extremely thin layers of reactive liquid medium (e.g. monolayers), it may be desirable to incorporate a pressure sensor 221 coupled to a flexible barrier mechanism 223 indicated in FIG. 15 as with a Langmuir trough. Interfacing the output of pressure sensor 221 to a suitable control device (not depicted), also capable of controlling the translation of movable barrier 220 under the direction of the microprocessor 232, enables control of the molecular orientation of the reactive liquid medium surface layer 202 for certain types of materials. As such it provides users with the possibility of controlling reaction rate and products with respect to both chemistry and morphology. Examples of surface (a.k.a. film) pressure ($\Pi$) versus area/molecular curves for a wide variety of compounds may be found in George L. Gaines Jr.'s book "Insoluble Monolayers at Liquid-Gas Interfaces", (Interscience Publishers, New York: 1966) as well as in Arthur W. Adamson's "Physical Chemistry of Surfaces (third edition)", (John Wiley & Sons, New York: 1976). Gaines also provides examples of techniques for measuring and controlling the area occupied by each molecular floating on the surface. A variety of factors can influence molecular arrangement within a layer. Although surface pressure is a very important variable, the rate at which a given pressure is obtained can also influence molecular alignment. The nature of the support liquid (and any impurities containing therein) can also impact orientation characteristics of the surface film.

It is preferred to maintain a constant focal distance between the upper surface of the reactive liquid medium and imaging apparatus. A variety of factors can result in changes to the position of the upper surface of the reactive liquid medium including, but not limited to, reactive liquid medium volumetric shrinkage during solidification, thermal expansion/contraction of reactive liquid medium or support liquid, as well as translation of system components into the reservoir during object fabrication. In the depicted embodiment of FIGS. 12–15, a fixed focal distance is maintained automatically through the use of an overflow spout and associated overflow valve 224 in fluid communication with the interior of the reservoir 200. An outlet 225 from the overflow spout 222 is coplanar with the upper surface of the layer 202 of the reactive liquid medium and is effective, in the known manner, to automatically maintain the upper surface of the layer 202 at that plane.

As the object 204 supported on the platform 210 is drawn into the reservoir 200 by a screw shaft 226 or other suitable elevating device, a volume of the non-reactive liquid support medium 206 corresponding to the volume of the fabricated solidified object is displaced and flows out of the overflow spout 222, hereby maintaining a substantially constant focal plane position. In some instances inclusion of the valve 224 or other suitable check mechanism to control overflow flow may be desirable. The reason for this is best understood by referring to FIG. 13. As the object 204 is translated downwardly, the reactive liquid medium 202 must flow across the upper surface 212 of the object. If uncontrolled overflow is permitted during this step of the process, it is conceivable that an excess amount of support liquid will be displaced in the time required for the reactive liquid medium to form a uniform overlying layer. To prevent this from occurring, it may be desirable to prevent overflow by closing the valve 224 or other suitable check mechanism until the reactive liquid medium has attained a uniform layer overlying the upper surface 212 of the object.

Figure 16:
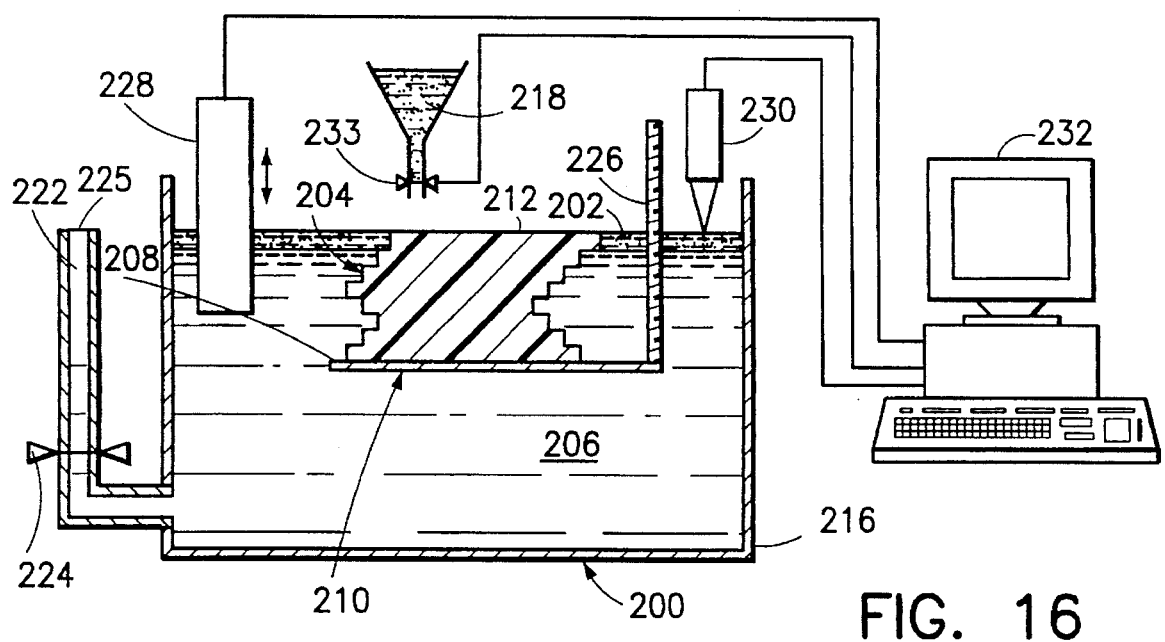
FIG. 16 is a side elevation view, partly in section, illustrating still another embodiment of the invention illustrated in FIG. 14, for maintaining the upper surface of the reactive liquid medium in the focal plane of an imaging optical system for the system of FIG. 1.

Another approach for maintaining a constant focal plane is depicted in FIG. 16. In this instance, a suitable displacement block 228 is translated into and out of the reactive liquid medium and/or non-reactive liquid medium to adjust the surface position of the reactive liquid medium. It may be desirable to include a suitable liquid level height sensor 230 capable of monitoring the position of the surface of the reactive liquid medium to permit feedback loops to be constructed which compensate for a variety of factors leading to fluctuations in surface height. As previously described, a suitable microprocessor 232 may be employed for monitoring and coordinating the changes from an established level of the surface of the reactive liquid medium relative to the imaging optical system 36 (FIG. 1) as detected by the sensor 230, then in response to the changes to detected, to suitably either replenish the reactive liquid medium in the reservoir when the height of the surface thereof falls below the desired height and withdrawing excess reactive liquid medium from the reservoir when the height of the surface thereof tends to increase above the desired height.

Utilizing any suitable mechanism, the displacement block 228 is operable for movement between raised and lowered spaced positions as depicted in FIG. 16 in one or both of the reactive liquid medium 202 and the non-reactive liquid medium 206. Under the selective control of the microprocessor 232, the displacement block 228 is movable in response to changes in the level of the surface of the reactive liquid medium 202 detected by the sensor 230 such that the surface of the reactive liquid medium is maintained at a focal plane which is a substantially constant distance from the imaging optical system 36. In response to the changes in the level of the surface of the reactive liquid medium, the reactive liquid medium is replenished in the reservoir, as by the dispenser 218, when the height of the surface of the reactive liquid medium falls below the desired height. The dispenser 218 has a nozzle 233 with an associated valve operated under the control of the microprocessor 232. In the alternative, excess reactive liquid medium is drawn from the reservoir in any suitable manner including the manner previously described when the height of the surface of the reactive liquid medium tends to increase above the desired height.

Figure 17:
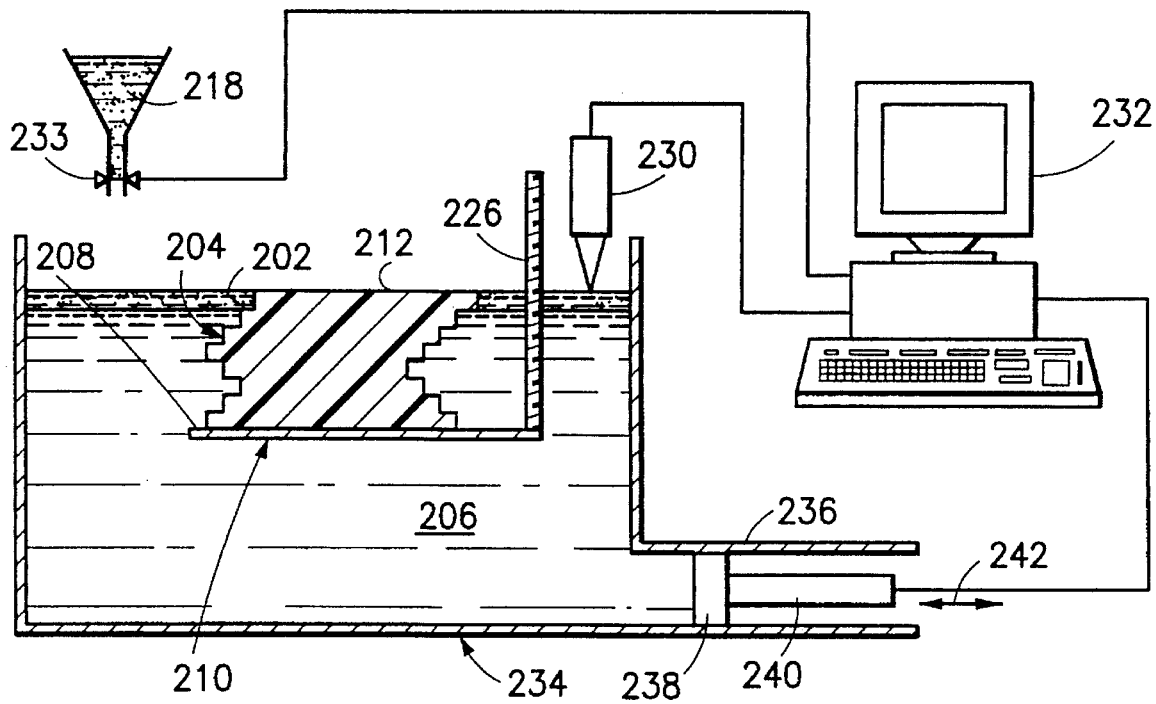
FIG. 17 is a side elevation view, partly in section, illustrating yet another embodiment of the invention illustrated in FIG. 14, for maintaining the upper surface of the reactive liquid medium in the focal plane of an imaging optical system for the system of FIG. 1.

Yet another manner of maintaining the exposed surface of the reactive liquid medium 202 substantially at the focal plane of the imaging optical system 36, is depicted in FIG. 17. In this instance, a modified reservoir 234 containing a substantially constant volume of the non-reactive liquid medium 206 includes a tubular extension 236 into which is mounted a sealed piston 238 powered by an actuator 240 and adapted for reciprocating movement in opposite directions as indicated by a double arrowhead 242. Under the control of the microprocessor 232 and in accord with the height of the exposed surface of the reactive liquid medium 202 as detected by the sensor 230, the piston 238 is operated by the actuator 240 to effectively alter the shape and volume of the reservoir thereby raising or lowering the position of the surface of the reactive liquid medium.

In any of the operations described with respect to FIGS. 12–17, imaging (i.e. selective solidification) of the freshly formed layer of the reactive liquid medium may be accomplished using any of the apparatus already disclosed. Reactive liquid media incorporating photoinitiators which bleach upon exposure are especially well suited to the embodiment of this invention in which the reactive layer is reacted through its entire thickness as opposed to partial depth. The cycle of imaging and generation of fresh overlying reactive liquid medium layers is repeated until the entire object has been constructed.

Figure 18:
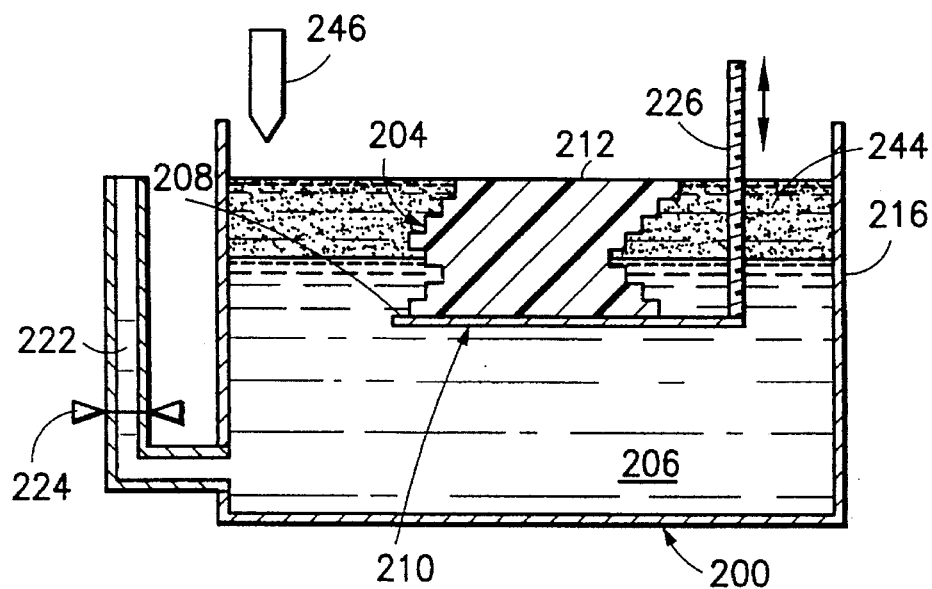
FIGS. 18–22 are side elevation views, partly in section, diagrammatically illustrating various components of a system embodying the invention, and depicting, respectively, successive positions of the components during one cycle of forming a layer object by "partial layer thickness curing" wherein reactive liquid medium is provided as a thicker layer overlying non-reactive liquid medium.

As illustrated in FIG. 18, another embodiment of the present invention utilizes a thicker layer 244 of reactive liquid medium to perform "partial layer thickness curing" in which multiple layers of the object 204 are formed prior to being drawn below the surface of the non-reactive liquid support medium 206. In this instance, precise control of the thickness of the reactive liquid medium is not as important as in the preceding embodiment since the exposure conditions and characteristics of the reactive liquid medium dictate the thickness of the solidified layers. Unlike the previously described instance illustrated in FIGS. 12–17 in which the thickness of the reactive liquid medium was the same above both the object 204 and above the non-reactive liquid medium, in this instance, the thicker layer 244 of the reactive liquid medium floats on the surface of the non-reactive liquid medium than overlies the upper surface of the object 204. A variety of devices may be utilized to provide a fresh layer of the reactive liquid medium overlying the upper surface 208 of the partially formed object. In principal, one can translate the object downward by a one layer thickness and wait for the reactive liquid medium to form a uniform layer overlying the object. In many instances, however, it is desirable to accelerate the formation of an overlying layer of the fresh reactive liquid medium. Equilibration times for viscous reactive liquid media which must flow over large distances to form thin layers are often unacceptably long when an object is formed from a large number of layers.

Figure 19:
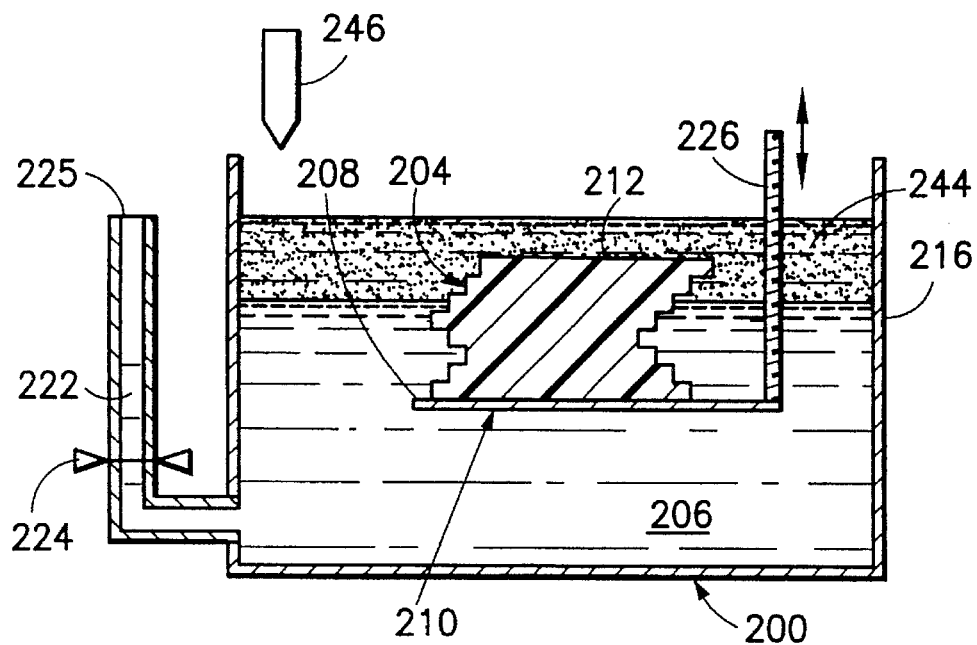

So-called "deep dunking" provides a procedure which serves to dramatically reduce the formation time of a layer of the reactive liquid medium. With this technique, it is first necessary to lower the object a substantially distance below the surface of the reactive liquid medium as depicted in FIG. 19. This causes the reactive liquid medium 244 to rapidly cover the overlying surface 208 of the object 204. If an object building reservoir is constructed like the reservoir of FIG. 19 with the overflow spout 222 enabling the non-reactive liquid medium 206 to maintain the desired height of the surface of the reactive liquid medium 244, then it is preferable that it be closed during the dunking operation to prevent excess loss of the non-reactive liquid medium. To avoid co-mingling of the non-reactive liquid medium with the overlying layer of the reactive liquid medium, it is most preferred that the upper surface 208 of the object 204 not fall below the interface between the liquid media.

Figure 20:
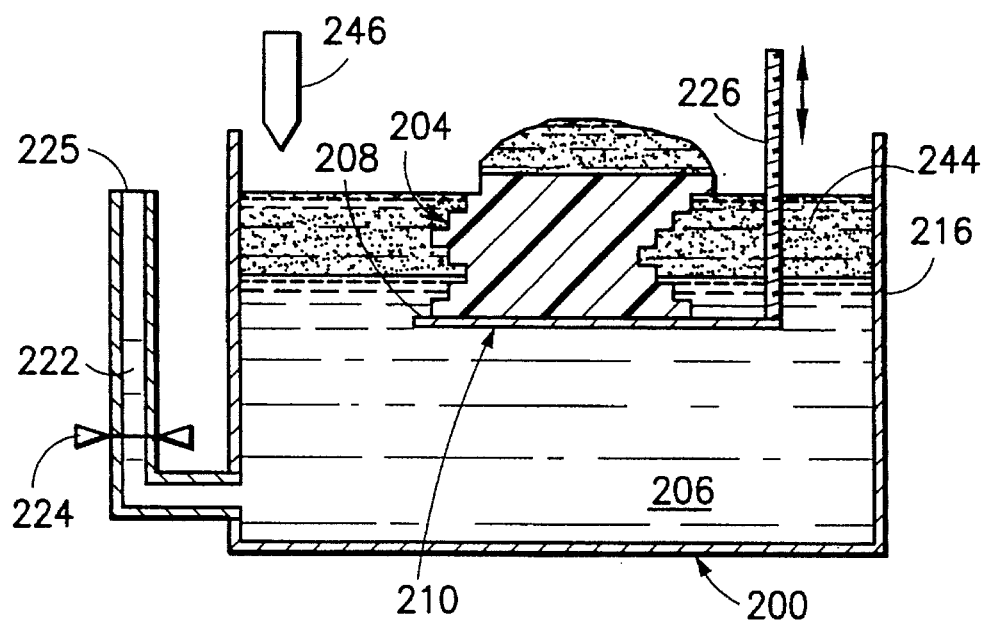
Figure 21:
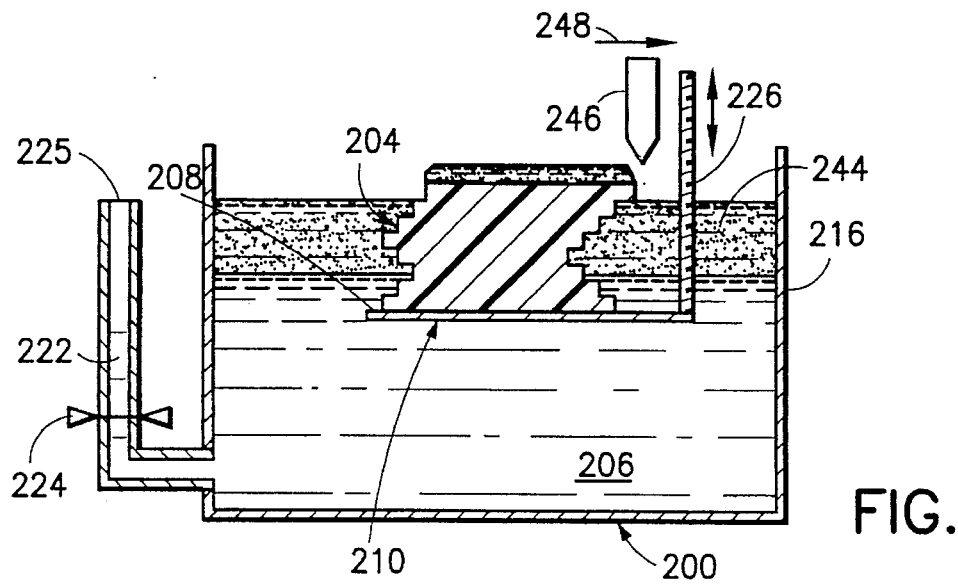
Figure 22:
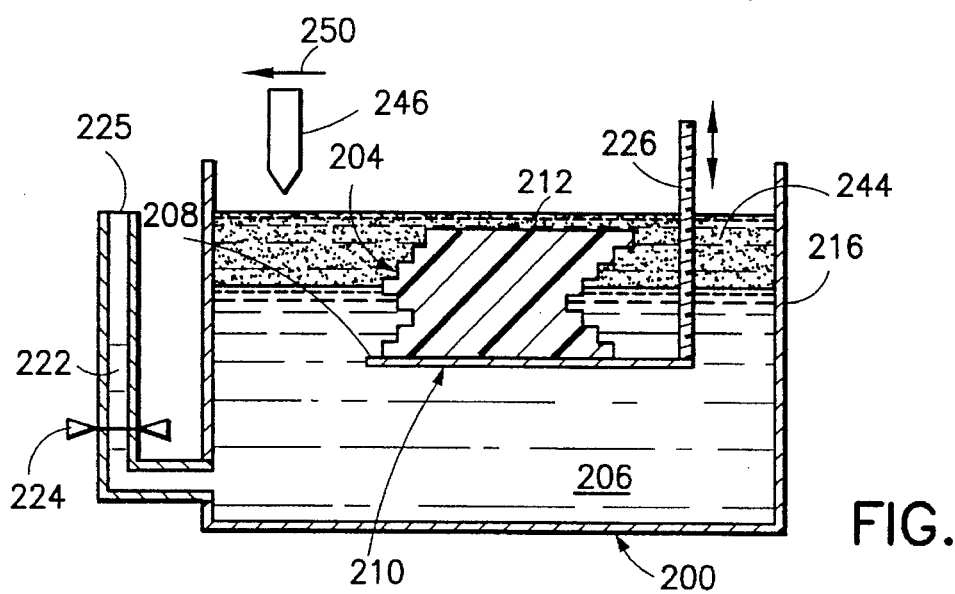

Once a layer of the reactive liquid medium having at least the desired thickness is formed above the object, the object is then raised so that the its upper surface is brought to within one layer thickness of a doctor blade 246 as depicted in FIG. 20. Translation of the doctor blade (FIG. 20) in the direction of an arrow 248 serves to remove excess reactive liquid medium from the overlying surface. It is understood that excess reactive liquid medium removal can also take place with a reverse translation of the doctor blade 246 in the direction of an arrow 250 (FIG. 22) and, indeed, in a series of steps in which the upper surface of the object is incrementally translated upward with successive passes by the doctor blade 246 in which small amounts of the liquid medium are removed on each pass until on the final pass of the doctor blade, the surface of the object lies within the desired layer thickness.

In the final step of reactive liquid medium layer formation (see FIG. 22), the object 204 is returned to a depth equivalent to a one layer thickness below the surface of the reactive liquid medium and any remaining small surface perturbations are permitted to equilibrate.

Figure 23:
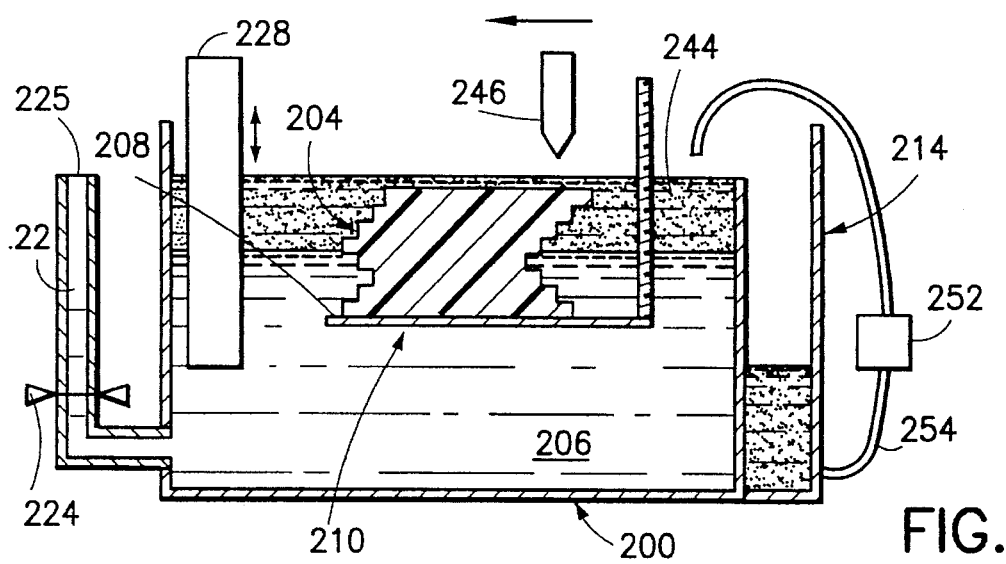
FIG. 23 is a side elevation view, partly in section, illustrating yet a further embodiment of the invention illustrated in FIG. 18, for maintaining the upper surface of the reactive liquid medium in the focal plane of an imaging optical system for the system of FIG. 1 and for replenishing the reactive liquid medium, as necessary.

During this procedure, adjustments may be made to insure that the upper surface of the reactive liquid medium remains at a fixed height. It is understood that it may be necessary to periodically add additional quantities of reactive liquid medium to the thicker layer 244 of the reactive liquid medium floating on top of the non-reactive liquid medium 206 in order to maintain a thickness which permits deep dunking subject to the described constraints. Such reactive liquid medium addition may be accomplished in a variety of ways. FIG. 23 illustrates an example of a system which permits modification to the thickness of the layer 244 of reactive liquid medium as well as control of the position of the upper surface of that layer. Additional quantities of reactive liquid medium may be added from the auxiliary reservoir 214 via a suitable pump 252 and associated conduit 254.

To reduce the thickness of the layer 244 of the reactive liquid medium, the displacement block 228 can be lowered into the reservoir so as to raise the surface of the reactive liquid medium to permit it to overflow into the adjacent auxiliary reservoir 214. During this operation, the overflow valve 224 for the non-reactive liquid medium 206 remains closed. To prevent the non-reactive liquid medium from covering the upper surface 208 of the object 204, it may be necessary to also raise the object. With an appropriate design, it may also be possible to accelerate the rate of overflow of the reactive liquid medium using the same doctor blade 246 normally employed for removing excess reactive liquid medium overlying the object resulting from the deep dunking operation. Once a desired quantity of reactive liquid medium has been removed, the upper surface of the reactive liquid medium may be returned to the proper imaging position by opening valve 224. To prevent excessive loss of support liquid and maintain maximum travel distance for the displacement block 228, it may be desirable to raise the displacement block 228 prior to opening the overflow valve 224. Through coordinated or independent operation of the displacement block and overflow spout, it is possible to return the upper surface of the reactive liquid medium to the correct imaging position.

Figure 24:
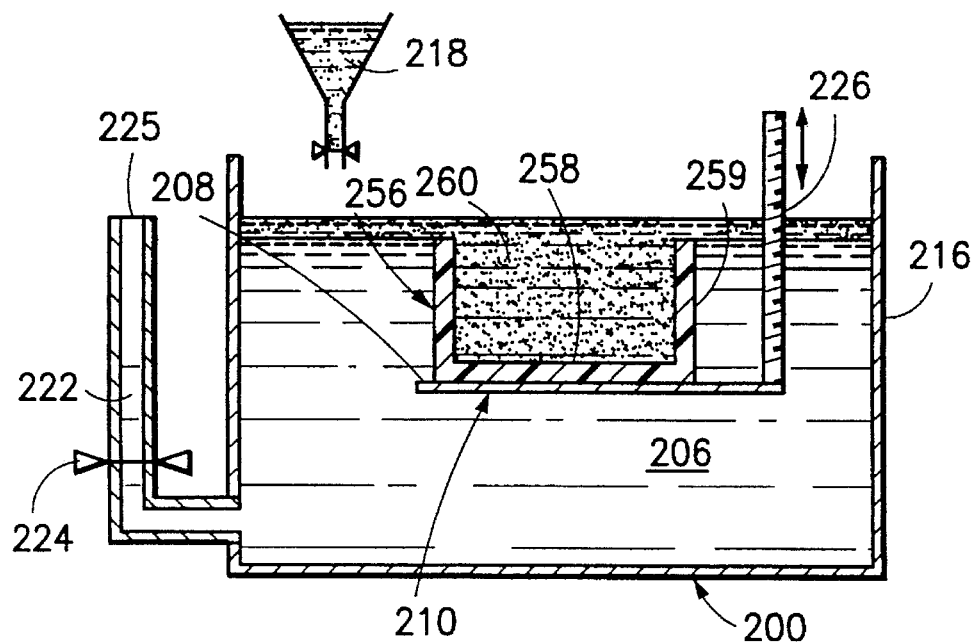
FIG. 24 is a side elevation view, partly in section, illustrating performance of the invention to construct an object undesirably configured to retain an excessive quantity of unsolidified reactive liquid medium.
Figure 25:
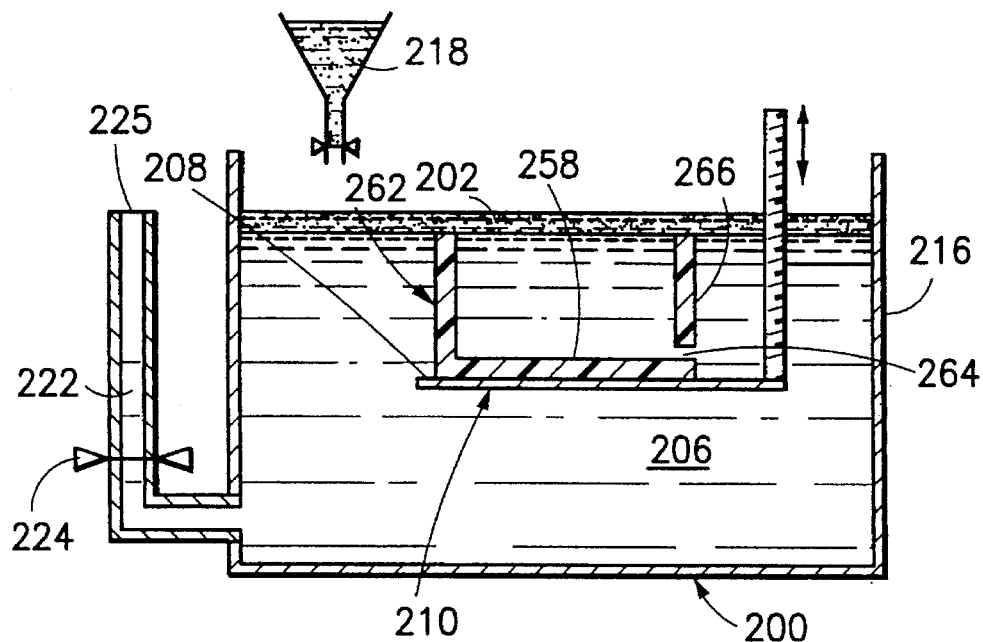
FIG. 25 is a side elevation view, partly in section, similar to FIG. 24, illustrating performance of the invention to construct a modified object desirably configured to prevent retention of an excessive quantity of unsolidified reactive liquid medium.

It is noteworthy that certain objects define an enclosed region which may entrap unsolidified reactive liquid medium as the object is drawn into the non-reactive liquid medium during the construction process. An example of an object with this type of geometry is illustrated in FIG. 24 which depicts, for example, an object 256 having the nature of a partially formed hollow cylinder with a solid bottom 258 and an upstanding wall 259 which together define an interior region 260 which traps, that is, prevents displacement of unreacted reactive liquid medium by the non-reactive liquid medium 206 after each layer is formed. Such a situation may be accommodated for by either adding additional reactive liquid medium to compensate for the entrapped reactive liquid medium or by design modifications to permit displacement of the unsolidified reactive liquid medium. While the modified object 256 is described as being cylindrical having an upstanding wall, it may be of any shape as desired with more than one upstanding wall. To avoid such a situation from occurring, a modified object 262, illustrated in FIG. 25, might incorporate, for example, a displacement hole 264 in a sidewall 266 immediately adjacent the solid bottom 258. With such a construction, the non-reactive liquid medium would be enabled to flow into the interior of the object 262 and continuously support the layer 202 of the reactive liquid medium over the entire expanse of the reservoir 200 as construction of the object 262 proceeds. After the object has been completely constructed, the displacement hole 264 would be filled during a post-processing operation.

Figure 26:
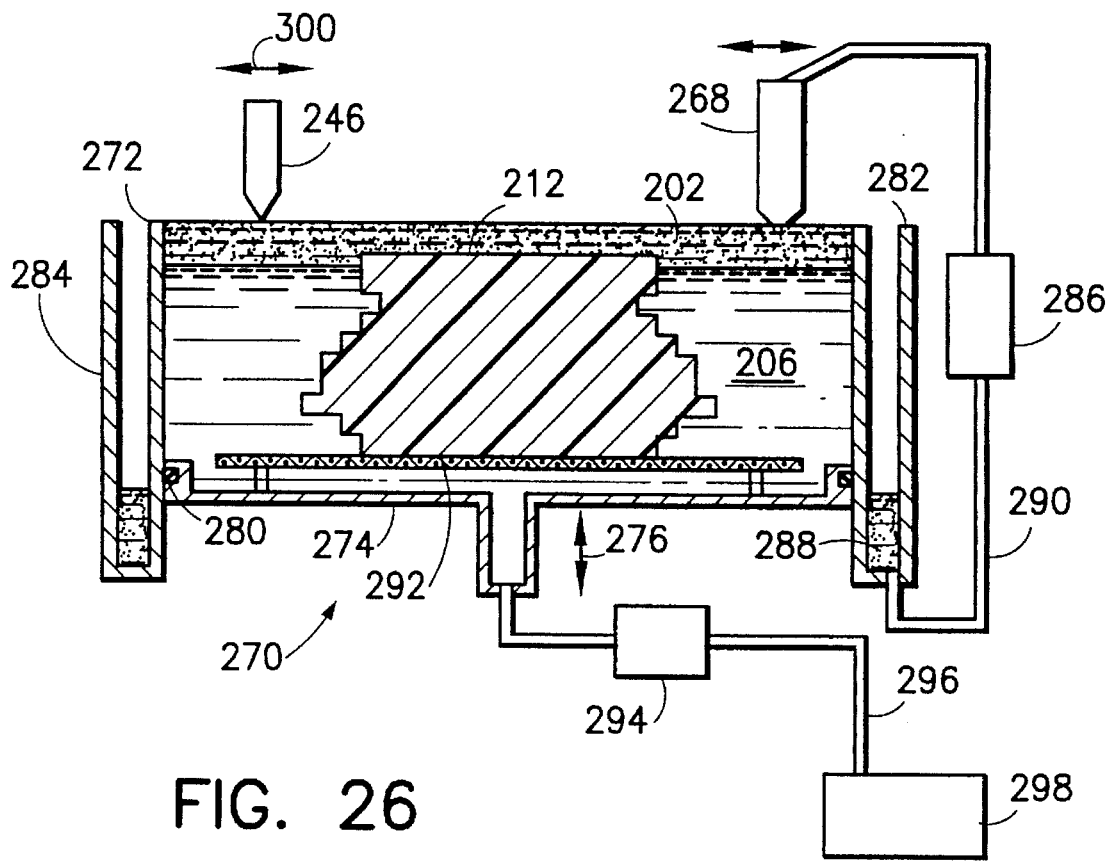
FIG. 26 is a side elevation view, partly in section, illustrating still another embodiment of the invention illustrated in FIG. 18, for maintaining the upper surface of the reactive liquid medium in the focal plane of an imaging optical system for the system of FIG. 1 and for replenishing the reactive liquid medium and for either replenishing or withdrawing the non-reactive liquid medium, as necessary.

FIG. 26 illustrates still another embodiment of the invention. In this instance, an extrusion coating die 268 is employed as a dispenser to directly deposit the thin layer 202 of the reactive liquid medium overlying the upper surface 208 of the most recently solidified layer of the object 204. In the depicted instance, a modified reservoir 270 comprises sidewalls 272 and an elevator 274 which serves as the base of the reservoir for lowering the object, the non-reactive liquid medium 206, and the layer 202 of the reactive liquid medium by the desired layer thickness. The elevators 274 can be raised and lowered relative to the sidewall 272 as indicated by a double arrow 276. A peripheral seal 280 is interposed between a peripheral edge of the elevator 27 and the sidewalls 272 to retain the non-reactive liquid medium as well as the reactive liquid medium within the reservoir. Also associated with the reservoir 270 are a pair of opposed auxiliary reservoirs 282, 284 which are separated from the reservoir 270 by the sidewalls 272. The auxiliary reservoirs 282, 284 are positioned to receive overflow quantities of the reactive liquid medium from the reservoir 270 and a suitable pump 286 is provided for drawing excess reactive liquid medium from the auxiliary reservoir 282 via a conduit 290 to the extrusion coating die 268. In addition, the auxiliary reservoir 282 can be used to receive an recycle excess reactive liquid medium continuously pumped through the extrusion coating die 268 during noncoating cycle times. Although not illustrated, a similar arrangement may be provided to draw excess reactive liquid medium from the auxiliary reservoir 284 to the extrusion coating die 268.

The object 262 may be supported on a foraminous grid 292 mounted on, but raised above, the elevator 274 to assure freedom of flow of the non-reactive liquid medium 206 underneath and around the object as it is being formed. As the object is being constructed, the elevator is systematically moved downwardly. Adjustments to the level of the upper surface of the reactive liquid medium 202 may be made, as required, by adding the non-reactive liquid medium 206 to, or removing it from, the reservoir. For example, a pump 294 may be suitably controlled by the microprocessor 232 (not illustrated in FIG. 26) to cause flow of the non-reactive liquid medium 206 through a conduit 296 between the reservoir 270 and a supply vessel 298.

Figure 11:
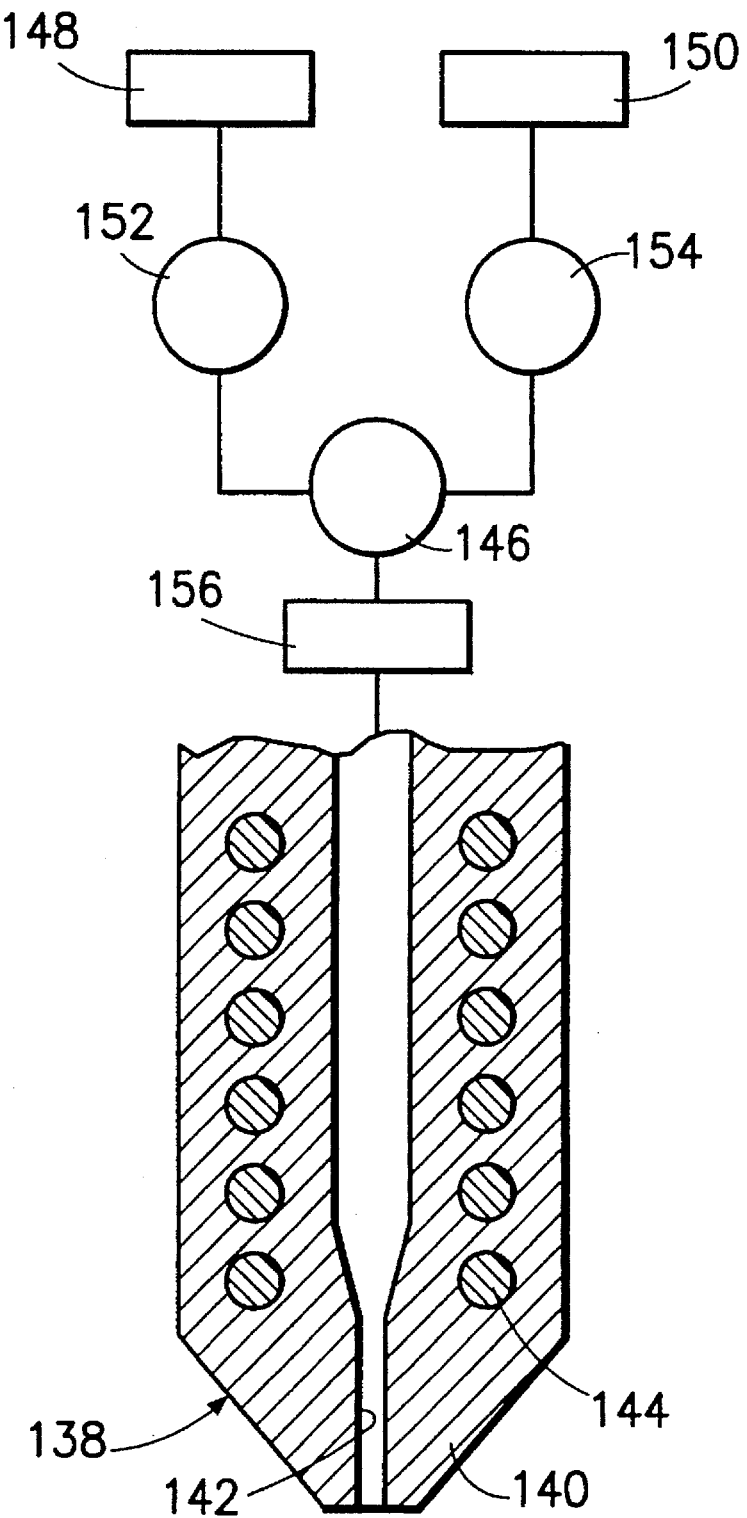
FIG. 11 is a diagrammatic representation of a dispensing system which can be employed with the invention, including a cross section view of an extrusion die.

The extrusion coating die 268 may be of any suitable construction including the slot extrusion coating die 138 illustrated in FIG. 11 or any of the other constructions disclosed in U.S. application Ser. No. 08/362,690. Prior to application of the new layer, elevator 274 is translated downward by an amount equal to the thickness of the next layer. The extrusion coating die 268 of FIG. 26 is then translated across the surface of the reservoir 270 thereby depositing a uniform layer 202 of the reactive liquid medium. In the manner described above, the doctor blade 246 may be used to accelerate levelling of any surface imperfections resulting during the extrusion coating process. The fresh layer may be imaged as already discussed. Periodically, additional non-reactive liquid medium may be introduced beneath the layer 202 of the reactive liquid medium without translating movement of the elevator 274. Such addition of reactive liquid medium causes displacement and recovery of excess reactive liquid medium when it is forced to flow into the adjoining auxiliary reservoirs 282, 284. The doctor blade 246 may be moved as indicated by double arrow 300 to accelerate excess reactive liquid medium flow into the auxiliary reservoirs.

The conditions required for spreading of a thin layer of one liquid on the surface of another are described by A. W. Adamson in *Physical Chemistry of Surfaces*, Third Edition, John Wiley & Sons, New York, 1976, pp. 103–111. Generally spontaneous spreading will occur if the spreading coefficient $S_{R.L.M./N.R.L.M.}$ defined by the following equation is positive:

$$S_{R.L.M./N.R.L.M.} = \gamma_{N.R.L.M.} - \gamma_{R.L.M.} - \gamma_{N.R.L.M.:R.L.M.}$$

where R.L.M. refers to the reactive liquid medium, N.R.L.M. refers to non-reactive liquid medium and $\gamma$ refers to the respective surface tensions. This is equivalent to requiring that the work of adhesion between the reactive liquid medium and the reactive liquid medium be larger than the cohesion within the reactive liquid medium. The formation of thin layers of reactive liquid medium on the surface of the non-reactive liquid medium may necessitate the use of surfactants to enable the reactive liquid medium to spread uniformly. Examples of surfactants suitable for use with acrylate or methacrylate reactive liquid media and perfluorinated support media include FC430 and FC431 fluoroaliphatic polymeric esters available from 3M. Such surfactants may themselves contain functional groups which enable their incorporation into the reactive liquid medium upon solidification. Examples of reactive compounds are FX13 and FX14 perfluoroalkyl acrylates suitable for use with perfluorinated support materials and acrylate or methacrylate based reactive liquid media available from 3M. The shrinkage which occurs for most solidifiable reactive liquid media during their transformation from liquid to solid may be compensated for by requiring additional displacement of non-reactive liquid medium by the movement of appropriated designed object translation devices into the non-reactive liquid medium.

Although it is important that the reactive liquid medium float on the surface of the non-reactive liquid medium, the density difference between the latter and the former should not be so large as to cause distortions in thin layers of the solidified object as it is drawn into the non-reactive liquid medium due to Archimedes' principle. This problem is especially acute for thin unsupported overhanging regions. Very dense liquids such mercury, gallium, or Wood's metal as proposed in U.S. Pat. No. 4,961,154 are not suitable for the present invention. Since many reactive liquid media undergo shrinkage upon solidification, it is important that the non-reactive liquid medium have a density of sufficient magnitude to prevent "sinking" of the solid object. Another preferred property of the non-reactive liquid medium is that it is immiscible with the reactive liquid medium or that it not absorb essential ingredients of the reactive liquid medium composition that might deleteriously effect its properties or otherwise prevent solidification of the reactive liquid medium. In some instances, it is preferred that the non-reactive liquid medium be non-reactive with respect to actinic radiation used to solidify the reactive liquid medium. This is not an absolute requirement, however, since it is possible to construct an object with partial layer thickness curing so that the supporting non-reactive liquid medium receives minimal or no exposure to the source of synergistic stimulation. Stability at elevated temperatures is a desired attribute of the support fluid in those cases where elevated temperatures are employed. The support liquid should also be nontoxic.

Figure 27:
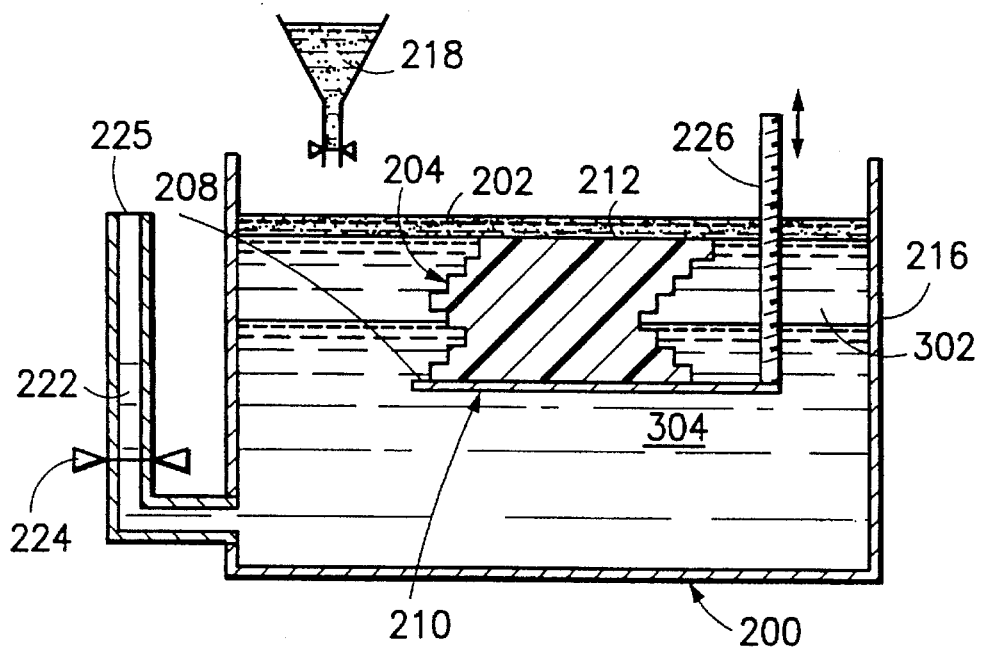
FIG. 27 is a side elevation view, partly in section, diagrammatically illustrating various components of a system embodying the invention, and depicting another embodiment of the invention wherein reactive liquid medium is applied as a thin layer overlying non-reactive liquid medium having multiple layers.

To prevent loss of the non-reactive liquid medium, it is preferred that it have a low vapor pressure. Low cost is another desirable attribute although even very expensive non-reactive liquid medium (on a unit cost basis) may be used effectively by employing multiple non-reactive support liquids. For example, viewing FIG. 27, a small amount of expensive support liquid 302 which satisfies the critical system properties is floated on the surface of a second, less expensive liquid 304. It is not necessary that the second support liquid 304 satisfy all of the properties satisfied by the first support liquid 302. The primary considerations are low cost, slightly higher density, and immiscibility with respect to the first support liquid.

In recapitulation, the use of a non-reactive support liquid as disclosed by the present invention offers a number of benefits relative to the conventional system limited in use to the reactive liquid medium. The amount of reactive liquid medium needed to manufacture an object is substantially reduced so that only a small amount in excess of the total volume of the object need be dispensed. Large objects made using the present invention would require only large volumes of the non-reactive support liquid and not large quantities of the reactive liquid medium. This reduces reactive liquid medium inventory, waste, and simultaneously minimizes worker exposure to potentially toxic materials. In the present invention, the object is substantially surrounded by an immiscible non-reactive liquid during a significant portion of the object fabrication time. As a result, no unreacted reactive liquid medium migrates into the part that might lead to distortion. Furthermore, switching materials is such simpler with the proposed invention than other systems. Specifically, once a part is produced, the thin layer of unreacted medium on the upper surface of the support liquid can be reacted to a thin solid and discarded. Disposable syringe-based fluid delivery permits the unused reactive liquid medium to be stored for future use as well as allowing users to quickly change from one material to the next by simply replacing the syringe.

Existing systems require waiting between successive layers until surface "waves" disappear. Total waiting time can be as great as the image exposure time and as such is an inherent system inefficiency which could be eliminated or greatly reduced by appropriate engineering of the support liquid. If full layer thickness curing is employed, then higher resolution objects can be produced by using fully cured very thin layers of the reactive liquid medium. Resolution in existing systems is a complex function of many variables. By employing a reactive liquid layer of desired thickness, the process cannot over-react (i.e. over-solidify) the reactive liquid medium. In a conventional reservoir system, excess reaction stimulation may lead to excess layer thickness. With full thickness layer curing, excess energy simply penetrates into the partially fabricated object with the desirable effect of reacting any unreacted material, or meets with unreactable support fluid. Conventional reservoirs generate "green" parts requiring post cure. With full thickness curing according to the invention, it is possible to fully react the material needed to form the object in situ.

Use of support liquids which are stable at elevated temperatures permits reducing the viscosity of the reactive liquid medium thereby enabling formulations containing higher molecular weight oligomers than otherwise possible to be made. Significantly shorter levelling times would be expected to be associated reduced viscosity arising from higher temperatures. Such reactive liquid media would form polymers more rapidly than their lower molecular weight analogues. As a result, it is possible to produce objects more rapidly with the higher molecular weight reactive liquid media permitted with this invention. In addition, better material properties would be expected from the higher molecular weight starting materials. Existing systems require long term exposure or reactive liquid media to whatever thermal conditions are needed and as such limit the temperature to relatively low values due to stability considerations.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Apparatus for producing from a reactive liquid medium capable of being solidified a three dimensional object constructed from a plurality of successive layers of the solidified reactive liquid medium when subjected to appropriate synergistic stimulation, said system comprising:

a reservoir containing a reactive liquid medium capable of being solidified and an underlying non-reactive liquid medium substantially immiscible with the reactive liquid medium for supporting the reactive liquid medium;

platform means for supporting the object being constructed;

control means for providing coordinate information to enable definition of a three dimensional object of required configuration;

a source of synergistic stimulation for solidifying at least part of a two dimensional layer at the surface of the reactive liquid medium;

imaging means responsive to said control means for selectively controlling the size and shape of that part of the two dimensional layer of the reactive liquid medium to be solidified; and replenishment means operable for providing a further two dimensional layer of the reactive liquid medium overlying the two dimensional solidified layer substantially at the surface of the reactive liquid medium;

wherein said imaging means includes:
  optical means intermediate said source of synergistic stimulation and the surface of the reactive liquid medium; and including:
    means for maintaining the surface of the reactive liquid medium at a focal plane which is a substantially constant distance from said imaging optical means; and wherein said maintaining means includes:
  means for sensing changes from the desired height of the surface of the reactive liquid medium relative to said imaging optical means; and
  means responsive to said sensing means for adjusting the height of the reactive liquid medium in said reservoir when the height of the surface of the reactive liquid medium falls below the desired height or rises above the desired height.

2. Apparatus as set forth in claim 1
wherein said height adjusting means includes:
  operative means for replenishing the non-reactive liquid medium in said reservoir when the height of the surface of the reactive liquid medium falls below a desired height and for withdrawing excess non-reactive liquid medium from said reservoir when the height of the surface of the reactive liquid medium tends to increase above the desired height.

3. Apparatus for producing from a reactive liquid medium capable of being solidified a three dimensional object constructed from a plurality of successive layers of the solidified reactive liquid medium when subjected to appropriate synergistic stimulation, said system comprising:

a reservoir containing a reactive liquid medium capable of being solidified and an underlying non-reactive liquid medium substantially immiscible with the reactive liquid medium for supporting the reactive liquid medium;

platform means for supporting the object being constructed;

control means for providing coordinate information to enable definition of a three dimensional object of required configuration;

a source of synergistic stimulation for solidifying at least part of a two dimensional layer at the surface of the reactive liquid medium;

imaging means responsive to said control means for selectively controlling the size and shape of that part of the two dimensional layer of the reactive liquid medium to be solidified; and replenishment means operable for providing a further two dimensional layer of the reactive liquid medium overlying the two dimensional solidified layer substantially at the surface of the reactive liquid medium;

means for maintaining the surface of the reactive liquid medium at a focal plane which is a substantially constant distance from said imaging optical means;

wherein said maintaining means includes:
  operative means for replenishing the non-reactive liquid medium in said reservoir when the height of the surface of the reactive liquid medium falls below a desired height and for withdrawing excess non-reactive liquid medium from said reservoir when the height of the surface of the reactive liquid medium tends to increase above the desired height.

4. Apparatus as set forth in claim 1
wherein said height adjusting means includes:
  means for adjusting the volume of the non-reactive liquid medium in said reservoir.

5. Apparatus as set forth in claim 3
wherein said maintaining means includes:
  means for adjusting the volume of the non-reactive liquid medium in said reservoir.

6. Apparatus as set forth in claim 4
wherein said volume adjusting means includes:
  piston means in fluid communication with the non-reactive liquid medium in said reservoir and movable in response to said sensing means between a first position for reducing the volume of the non-reactive liquid medium in the reservoir when the height of the surface of the reactive liquid medium falls below the desired height and a second position for increasing the volume of the non-reactive liquid medium the reservoir when the height of the surface of the reactive liquid medium tends to increase above the desired height.

7. Apparatus as set forth in claim 3 including:
piston means in fluid communication with the non-reactive liquid medium in said reservoir and operable to increase the volume of the non-reactive liquid medium in said reservoir when the height of the surface of the reactive liquid medium falls below the desired eighth and to tend to decrease the volume of the non-reactive liquid medium in said reservoir when the height of the surface of the reactive liquid medium increases above the desired height.

8. Apparatus as set forth in claim 1
wherein said height adjusting means includes:
  displacement mass means within said reservoir movable between first and second spaced positions in at least one of the reactive liquid medium and the non-reactive liquid medium, said displacement mass means being movable in response to changes in the level of the surface of the reactive liquid medium such that the surface of the reactive liquid medium is maintained at the focal plane.

9. Apparatus for producing from a reactive liquid medium capable of being solidified a three dimensional object constructed from a plurality of successive layers of the solidified reactive liquid medium when subjected to appropriate synergistic stimulation, said system comprising:

a reservoir containing a reactive liquid medium capable of being solidified and an underlying non-reactive liquid medium substantially immiscible with the reactive liquid medium for supporting the reactive liquid medium;

platform means for supporting the object being constructed;

control means for providing coordinate information to enable definition of a three dimensional object of required configuration;

a source of synergistic stimulation for solidifying at least part of a two dimensional layer at the surface of the reactive liquid medium;

imaging means responsive to said control means for selectively controlling the size and shape of that part of the two dimensional layer of the reactive liquid medium to be solidified; and replenishment means operable for providing a further two dimensional layer of the reactive liquid medium overlying the two dimensional solidified layer substantially at the surface of the reactive liquid medium;

wherein said replenishment means is positioned in a plane intermediate said imaging means and the surface of the reactive liquid medium and movable across the surface of the reactive liquid medium; and wherein said imaging means includes a programmable array operable for projecting an image onto that part of the new two dimensional layer of the reactive liquid medium overlying the object to be solidified; and control means for moving the image across the new two dimensional layer in unison with said replenishment means.

10. Apparatus for producing from a reactive liquid medium capable of being solidified a three dimensional object constructed from a plurality of successive layers of the solidified reactive liquid medium when subjected to appropriate synergistic stimulation, said system comprising:

a reservoir containing a reactive liquid medium capable of being solidified and an underlying non-reactive liquid medium substantially immiscible with the reactive liquid medium for supporting the reactive liquid medium;

platform means for supporting the object being constructed;

control means for providing coordinate information to enable definition of a three dimensional object of required configuration;

a source of synergistic stimulation for solidifying at least part of a two dimensional layer at the surface of the reactive liquid medium;

imaging means responsive to said control means for selectively controlling the size and shape of that part of the two dimensional layer of the reactive liquid medium to be solidified; and replenishment means operable for providing a further two dimensional layer of the reactive liquid medium overlying the two dimensional solidified layer; and including:

barrier means for confining the reactive liquid medium within an enclosed area in said reservoir and movable for altering the size of the enclosed area of the reactive liquid medium so as to maintain a thickness thereof equivalent to the thickness of that part of the next succeeding two dimensional layer to be solidified.

11. Apparatus as set forth in claim 10 including:

sensor means for measuring the thickness of the reactive liquid medium;

wherein said barrier is movable in response to said sensor means so as to maintain the thickness of the reactive liquid medium so as to be equivalent to the thickness of that part of the next succeeding two dimensional layer to be solidified.

12. Apparatus for producing from a reactive liquid medium capable of being solidified a three dimensional object constructed from a plurality of successive layers of the solidified reactive liquid medium when subjected to appropriate synergistic stimulation, said system comprising:

a reservoir containing a reactive liquid medium capable of being solidified and an underlying non-reactive liquid medium substantially immiscible with the reactive liquid medium for supporting the reactive liquid medium;

platform means for supporting the object being constructed;

control means for providing coordinate information to enable definition of a three dimensional object of required configuration;

a source of synergistic stimulation for solidifying at least part of a two dimensional layer at the surface of the reactive liquid medium;

imaging means responsive to said control means for selectively controlling the size and shape of that part of the two dimensional layer of the reactive liquid medium to be solidified;

replenishment means operable for providing a further two dimensional layer of the reactive liquid medium overlying the two dimensional solidified layer; and means for controlling the molecular alignment within the reactive liquid medium during exposure thereof to synergistic stimulation.

13. Apparatus as set forth in claim 12 wherein said controlling means includes:

a movable pressure barrier proximate the layer of the reactive liquid medium for inducing molecular alignment within the reactive liquid medium.

14. Apparatus for producing from a reactive liquid medium capable of being solidified a three dimensional object constructed from a plurality of successive layers of the solidified reactive liquid medium when subjected to appropriate synergistic stimulation, said apparatus comprising:

a reservoir containing a reactive liquid medium capable of being solidified and an underlying non-reactive liquid medium substantially immiscible with the reactive liquid medium for supporting the reactive liquid medium;

platform means for supporting the object being constructed within the reservoir, said platform means having an upper surface and being initially positioned at a depth which is substantially equal to a uniform thickness of that part of a first layer to be solidified to begin forming the object and continuing to support the object being constructed on the platform within the reservoir;

control means for providing coordinate information to enable definition of a three dimensional object of required configuration;

a source of synergistic stimulation for solidifying at least part of a two dimensional layer at the surface of the reactive liquid medium;

imaging means response to said control means for selectively controlling the size and shape of that part of the two dimensional layer of the reactive liquid medium to be solidified and operable in two successive operations to solidify a first part of a further two dimensional layer of the reactive liquid medium and, thereafter, to solidify a second part of the further two dimensional layer of the reactive liquid medium; and replenishment means operable for providing the further two dimensional layer of the reactive liquid medium overlying the two dimensional solidified layer substantially at the surface of the reactive liquid medium after solidification of the preceding two dimensional layer of the reactive liquid medium;

means for removing from said reservoir all unreacted reactive liquid medium after solidification of the first part of the further two dimensional layer of the reactive liquid medium;

said replenishment means being operable for replacing the reactive liquid medium removed after solidification of the first part of the further two dimensional layer of the reactive liquid medium with a new layer of the reactive liquid medium having a substantially uniform thickness and generally coplanar with and equivalent to the thickness of the first solidified part.

15. Apparatus as set forth in claim 14 including:

a first source of reactive liquid medium;

a second source of reactive liquid medium; and mixing means for selectively connecting said first source to said replenishment means and said second source to said replenishment means.

16. Apparatus as set forth in claim 15 wherein said first source contains a first composition of the reactive liquid medium; and wherein said second source contains a second composition of the reactive liquid medium, the second composition being different from the first composition.

17. Apparatus for producing from a reactive liquid medium capable of being solidified a three dimensional object constructed from a plurality of successive layers of the solidified reactive liquid medium when subjected to appropriate synergistic stimulation, said apparatus comprising:

a reservoir containing a reactive liquid medium capable of being solidified and an underlying non-reactive liquid medium substantially immiscible with the reactive liquid medium for supporting the reactive liquid medium;

platform means for supporting the object being constructed within the reservoir, said platform means having an upper surface and being initially positioned at a depth which is substantially equal to a uniform thickness of that part of a first layer to be solidified to begin forming the object and continuing to support the object being constructed on the platform within the reservoir;

control means for providing coordinate information to enable definition of a three dimensional object of required configuration;

a source of synergistic stimulation for solidifying at least part of a two dimensional layer at the surface of the reactive liquid medium;

imaging means responsive to said control means for selectively controlling the size and shape of that part of the two dimensional layer of the reactive liquid medium to be solidified;

a first source of reactive liquid medium;

a second source of reactive liquid medium;

mixing means for selectively connecting said first source to said replenishment means and said second source to said replenishment means;

replenishment means operable for providing the further two dimensional layer of the reactive liquid medium overlying the two dimensional solidified layer substantially at the surface of the reactive liquid medium after solidification of the preceding two dimensional layer of the reactive liquid medium; and means for removing from said reservoir all unreacted reactive liquid medium after solidification of the first part of the further two dimensional layer of the reactive liquid medium.

18. Apparatus as set forth in claim 15 wherein said first source contains a first composition of the reactive liquid medium; and wherein said second source contains a second composition of the reactive liquid medium, the second composition being different from the first composition.

19. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the step of:

(h) adjusting the thickness of the further layer of the reactive liquid medium to achieve the further layer of step (g); and wherein the reactive liquid medium is confined within an enclosed area in the reservoir; and wherein step (h) includes the step of:

(i) altering the size of the enclosed area of the further layer of the reactive liquid medium so as to maintain a thickness thereof equivalent to the thickness of that part of the next succeeding two dimensional layer to be solidified.

20. A method as set forth in claim 19 wherein step (h) includes the steps of:

(i) providing a movable barrier within the reservoir for at least partially restraining the reactive liquid medium such that the reactive liquid medium is confined within the enclosed area which is smaller than that of the reservoir; and (j) moving the movable barrier so as to maintain the thickness of the further layer of the reactive liquid medium so as to be equivalent to the thickness of that part of the next succeeding two dimensional layer to be solidified.

21. A method as set forth in claim 19 wherein the reactive liquid medium is confined within an enclosed area in the reservoir; and wherein step (g) includes the steps of:

(h) lowering the platform to an operating depth such that an uppermost surface of the object being formed is below the surface of the reactive liquid medium and such that a quantity of the reactive liquid medium overlying the object is at least equivalent to the thickness of that part of the next succeeding two dimensional layer to be solidified;

(i) raising the platform until the uppermost surface of the object being formed rises above the surface of the reactive liquid medium;

(j) drawing a doctor blade across the upper surface of the object being formed and parallel thereto and at a uniform distance therefrom, the uppermost surface of the object being formed being a distance below the doctor blade equal to the desired layer thickness for the next layer to be formed, thereby removing excess amounts of the reactive liquid medium from the upper surface of the object to result in a substantially uniform thickness overlying the object;

(k) from the position assumed by the platform as a result of step (g) for the formation of the most recently solidified layer, lowering the platform by a distance which is substantially equal to the thickness of that part of the next succeeding two dimensional layer to be solidified; and (l) altering the size of the enclosed area of the further layer of the reactive liquid medium to maintain a thickness thereof equivalent to the thickness of that part of the next succeeding two dimensional layer to be solidified.

22. A method as set forth in claim 21
wherein step (j) includes the steps of:
(m) providing a movable barrier within the reservoir for at least partially restraining the reactive liquid medium such that the reactive liquid medium is confined within an enclosed area which is less than that of the reservoir; and
(n) moving the movable barrier so as to maintain the thickness of the further layer of the reactive liquid medium to be equivalent to the thickness of that part of the next succeeding two dimensional layer to be solidified.

23. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (d) includes the step of:
(h) positioning the imaging means intermediate the source of synergistic stimulation and the reactive liquid medium and spaced from the surface of the reactive liquid medium; and further including the step of
(i) maintaining the surface of the reactive liquid medium at a focal plane which is a substantially constant distance from the imaging means; and wherein step (i) includes the step of:
(j) replenishing the reactive liquid medium in the reservoir when the height of the surface of the reactive liquid medium falls below a desired height and withdrawing excess reactive liquid medium from the reservoir when the height of the surface of the reactive liquid medium tends to increase above the desired height.

24. A method as set forth in claim 23
wherein step (i) includes the steps of:
(j) sensing changes from an established level of the surface of the reactive liquid medium relative to the imaging optics; and
(k) in response to the changes sensed in step (j), replenishing the reactive liquid medium in the reservoir when the height of the surface of the reactive liquid medium falls below the desired height and withdrawing excess reactive liquid medium from the reservoir when the height of the surface of the reactive liquid medium tends to increase above the desired height.

25. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (d) includes the step of:

(h) positioning the imaging means intermediate the source of synergistic stimulation and the reactive liquid medium and spaced from the surface of the reactive liquid medium; and wherein the method further includes the step of:

(i) maintaining the surface of the reactive liquid medium at a focal plane which is a substantially constant distance from the imaging means; and wherein step (i) includes the step of:

(j) adjusting the volume of the non-reactive liquid medium in the reservoir.

26. A method as set forth in claim 25 wherein step (j) includes the steps of:

(i) reducing the volume of the non-reactive liquid medium in the reservoir when the height of the surface of the reactive liquid medium falls below the desired height; and (k) increasing the volume of the non-reactive liquid medium the reservoir when the height of the surface of the reactive liquid medium tends to increase above the desired height.

27. A method as set forth in claim 25 wherein step (i) includes the steps of:

(j) sensing changes from an established level of the surface of the reactive liquid medium relative to the imaging optics; and (k) in response to changes in the level of the surface of the reactive liquid medium sensed in step (j), operating a piston in fluid communication with the non-reactive liquid medium in the reservoir to tend to increase the volume of the non-reactive liquid medium in the reservoir when the height of the surface of the reactive liquid medium falls below the desired height and to tend to decrease the volume of the non-reactive liquid medium in the reservoir when the height of the surface of the reactive liquid medium increases above the desired height.

28. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (d) includes the step of:

(h) positioning the imaging means intermediate the source of synergistic stimulation and the reactive liquid medium and spaced from the surface of the reactive liquid medium; and wherein the method further includes the steps of:

(i) maintaining the surface of the reactive liquid medium at a focal plane which is a substantially constant distance from the imaging means;

(j) providing displacement mass means within the reservoir operable for movement between first and second spaced positions in at least one of the reactive liquid medium and the non-reactive liquid medium; and (k) moving the displacement mass means in response to changes in the level of the surface of the reactive liquid medium such that the surface of the reactive liquid medium is maintained at a focal plane which is a substantially constant distance from the imaging optical means.

29. A method as set forth in claim 28 wherein step (h) includes the step of:

(i) sensing changes from an established level of the surface of the reactive liquid medium relative to the imaging optics.

30. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the steps of:

(h) providing an extrusion die having an elongated slot extending across the surface of the reactive liquid medium at a uniform distance;

(i) causing flow of the reactive liquid medium from a source thereof through the elongated slot; and (j) translating the extrusion die across the surface of the reactive liquid medium; and wherein the method includes the step of:

(k) withdrawing excess reactive liquid medium from the reservoir when the height of the surface of the reactive liquid medium tends to increase above a desired height.

31. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the steps of:

(h) providing an extrusion die having an elongated slot extending across the surface of the reactive liquid medium at a uniform distance;

(i) causing flow of the reactive liquid medium from a source thereof through the elongated slot; and (j) translating the extrusion die across the surface of the reactive liquid medium; and wherein the method includes the step of:

(k) withdrawing excess reactive liquid medium from the reservoir when the thickness of the reactive liquid medium tends to increase beyond a desired thickness.

32. A method as set forth in claim 30 including the step of:

(l) providing an auxiliary reservoir adjacent the reservoir for receiving excess reactive liquid medium from the reservoir during step (k).

33. A method as set forth in claim 31 including the step of:

(1) providing an auxiliary reservoir adjacent the reservoir for receiving excess reactive liquid medium from the reservoir during step (k).

34. A method as set forth in claim 32 including the step of:

(m) providing displacement mass means within the reservoir operable for movement between first and second spaced positions in at least one of the reactive liquid medium and the non-reactive liquid medium; and (n) moving the displacement mass means in response to changes in the level of the surface of the reactive liquid medium such that the surface of the reactive liquid medium is maintained at a focal plane which is a substantially constant distance from the imaging optical means.

35. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the steps of:

(h) providing an extrusion die having an elongated slot extending across the surface of the reactive liquid medium at a uniform distance;

(i) causing flow of the reactive liquid medium from a source thereof through the elongated slot; and (j) translating the extrusion die across the surface of the reactive liquid medium; and wherein the method includes the steps of:

(k) sensing changes in the height of the surface of the reactive liquid medium from a desired height thereof;

(l) providing displacement mass means within the reservoir movable between first and second spaced positions in at least one of the reactive liquid medium and the non-reactive liquid medium; and (m) moving the displacement mass means from the first position to the second position in response to changes in the level of the surface of the reactive liquid medium detected in step (k) such that the surface of the reactive liquid medium is maintained at a focal plane which is a substantially constant distance from the imaging optical means.

36. A method as set forth in claim 33
wherein step (k) includes the step of
(m) adding non-reactive liquid medium to the reservoir so as to displace reactive liquid medium and cause it to overflow into the auxiliary reservoir.

37. A method as set forth in claim 32
wherein step (k) includes the step of
(m) adding non-reactive liquid medium to the reservoir so as to displace reactive liquid medium and cause it to overflow into the auxiliary reservoir.

38. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the steps of:
(h) providing an extrusion die having an elongated slot extending across the surface of the reactive liquid medium at a uniform distance;
(i) causing flow of the reactive liquid medium from a source thereof through the elongated slot; and
(j) translating the extrusion die across the surface of the reactive liquid medium; and wherein the method includes the step of:
(k) heating at least one of the reactive liquid medium and the non-reactive liquid medium to control the viscosity thereof.

39. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein steps (d), (f) and (g) include the steps of:
(h) positioning the dispenser means in a plane intermediate the imaging means and the surface of the reactive liquid medium; and
(i) from an imaging means including a programmable array, projecting an image onto that part of the new two dimensional layer of the reactive liquid medium overlying the object to be solidified; and
(j) moving the imaging means across the new two dimensional layer in unison with the dispenser means.

40. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the steps of:

(h) removing from the reservoir all unreacted reactive liquid medium after step (f); and (i) adding a new layer of reactive liquid medium overlying the surface of the non-reactive liquid medium.

41. The method of claim 40 wherein step (i) includes the steps of:

(j) adding a new layer of reactive liquid medium having a composition different from the preceding layer.

42. The method of claim 40 wherein step (i) includes the steps of:

(j) adding a new layer of reactive liquid medium having a composition the same as the preceding layer.

43. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein step (g) includes the step of:

(h) controlling the molecular alignment within the reactive liquid medium during exposure to synergistic stimulation.

44. The method of claim 43 wherein step (h) includes the step of:

(i) applying pressure to the layer of the reactive liquid medium by a movable pressure barrier to induce molecular alignment within the reactive liquid medium.

45. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to he solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying at least part of the new two dimensional layer of the reactive liquid medium;

(g) providing a further layer of the reactive liquid medium having a substantially uniform thickness overlying the new solidified layer on the object and equivalent to the thickness of that part of the next succeeding two dimensional layer to be solidified; and repeating steps (c) through (g) until all of the layers of the solidified reactive liquid medium define the three dimensional object being constructed;

wherein the object being formed has a bottom and at least one upstanding wall defining an interior region; and including the step of:

(h) forming the upstanding wall with a displacement hole therethrough adjacent the bottom to enable flow of the non-reactive liquid medium into the interior region.

46. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a new two dimensional layer of the reactive liquid medium to be solidified;

(e) controlling operation of the imaging means utilizing coordinate information defining a three dimensional object of required configuration;

(f) solidifying a first part of the new two dimensional layer of the reactive liquid medium;

(g) after step (f), removing from the reservoir all unreacted reactive liquid medium;

(h) replacing the reactive liquid medium removed in step (g) with a new layer of the reactive liquid medium having a substantially uniform thickness and generally coplanar with and equivalent to the thickness of the first part solidified in step (f);

(i) solidifying a second part of the new two dimensional layer of the reactive liquid medium corresponding to the replacement liquid medium of step (h);

(j) providing a further layer of the reactive liquid medium having a substantially uniform thickness overlying the new solidified layer on the object and equivalent to the thickness of that part of the next succeeding two dimensional layer to be solidified; and repeating steps (c) through (j) until all of the layers of the solidified reactive liquid medium define the three dimensional object being constructed.

47. The method of claim 46 wherein the further layer of the reactive liquid medium provided in step (j) is of a composition different from the preceding layer.

48. The method of claim 46 wherein the further layer of the reactive liquid medium provided in step (j) is of a composition the same as the preceding layer.

49. The method of claim 46 wherein the first part of the new two dimensional layer of the reactive liquid medium solidified in step (f) is of a composition different from the second part of the new two dimensional layer of the reactive liquid medium solidified in step (i).

50. The method of claim 46 wherein the first part of the new two dimensional layer of the reactive liquid medium solidified in step (f) is of the same composition as the second part of the new two dimensional layer of the reactive liquid medium solidified in step (i).

51. A method of producing from a reactive liquid medium capable of being solidified a three dimensional object constructed from a plurality of successive layers of the solidified reactive liquid medium when subjected to appropriate synergistic stimulation, said method comprising the steps of:

(a) providing a reservoir containing a reactive liquid medium capable of being solidified and an underlying non-reactive liquid medium substantially immiscible with the reactive liquid medium for supporting the reactive liquid medium;

(b) providing a platform within the reservoir having an upper surface and being initially positioned at a depth which is substantially equal to a uniform thickness of that part of a first layer to be solidified to begin forming the object and continuing to support the object being constructed on the platform within the reservoir;

(c) directing a source of synergistic stimulation toward the reactive liquid medium to be solidified;

(d) operating imaging means for selectively controlling the size and shape of that part of a further two dimensional layer of the reactive liquid medium to be solidified;

(e) controlling operation of the imaging means utilizing coordinate information defining a three dimensional object of required configuration;

(f) solidifying the further two dimensional layer of the reactive liquid medium;

(g) after step (f), removing from the reservoir all unreacted reactive liquid medium;

(h) replacing the reactive liquid medium removed in step (g) with a new layer of the reactive liquid medium having a substantially uniform thickness and overlying the preceding solidified layer of the reactive liquid medium;

(i) solidifying the new two dimensional layer of the reactive liquid medium corresponding to the replacement liquid medium of step (h); and repeating steps (c) through (i) until all of the layers of the solidified reactive liquid medium define the three dimensional object being constructed.

52. The method of claim 51 wherein the further layer of the reactive liquid medium provided in step (i) is of a composition different from the preceding layer.

53. The method of claim 51 wherein the further layer of the reactive liquid medium provided in step (i) is of a composition the same as the preceding layer.

* * * * *

UNITED STATES PATENT AND TRADEMARK OFFICE
CERTIFICATE OF CORRECTION

PATENT NO. : 5,573,721
DATED : November 12, 1996
INVENTOR(S) : Paul C. Gillette

It is certified that error appears in the above-indentified patent and that said Letters Patent is hereby corrected as shown below:

Column 24, claim 7, line 35, replace "eighth" with --height--.

Signed and Sealed this

Twenty-fourth Day of June, 1997

Attest:

BRUCE LEHMAN

*Attesting Officer*     *Commissioner of Patents and Trademarks*